US008623435B2

(12) United States Patent
Lucey et al.

(10) Patent No.: US 8,623,435 B2
(45) Date of Patent: Jan. 7, 2014

(54) LOW-FAT AND FAT-FREE CHEESE WITH IMPROVED PROPERTIES

(75) Inventors: John A. Lucey, Madison, WI (US); Ciara A. Brickley, Cork County (IE); Selvarani Govindasamy-Lucey, Madison, WI (US); Mark E. Johnson, Madison, WI (US); John A. Jaeggi, Brooklyn, WI (US); Eileen Merlini Salim, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 633 days.

(21) Appl. No.: 12/104,142

(22) Filed: Apr. 16, 2008

(65) Prior Publication Data

US 2009/0068311 A1    Mar. 12, 2009

Related U.S. Application Data

(60) Provisional application No. 60/925,157, filed on Apr. 17, 2007.

(51) Int. Cl.
*A23C 9/12* (2006.01)

(52) U.S. Cl.
USPC .................. 426/39; 426/34; 426/36; 426/582

(58) Field of Classification Search
USPC .......................... 426/34, 36, 38, 39, 580, 582
See application file for complete search history.

(56) References Cited

U.S. PATENT DOCUMENTS

| | | | |
|---|---|---|---|
| 4,329,374 A | 5/1982 | Invernizzi et al. | |
| 4,459,313 A | 7/1984 | Swanson et al. | |
| 5,079,024 A | 1/1992 | Crane | |
| 5,225,220 A | 7/1993 | Gamay | |
| 5,374,443 A | 12/1994 | Jackson et al. | |
| 5,891,495 A | 4/1999 | Cain et al. | |
| 6,113,953 A | 9/2000 | McMahon | |
| 6,368,652 B1 * | 4/2002 | Heertje et al. | 426/601 |
| 2010/0215819 A1 | 8/2010 | Manera | |

FOREIGN PATENT DOCUMENTS

WO    WO 92/09209    6/1992

OTHER PUBLICATIONS

Bourne, M. "Texture Profile Analysis," *Food Technol.*, 32:62-66 (1978).
Bryant, C. and McClements, D., "Molecular Basis of Protein Functionality with Special Consideration of Cold-Set Gels Derived from Heat-Denatured Whey," *Trends Food Sci. Technol.*, 9:143-151 (1998).
Carić, M. et al., "Effects of Emulsifying Agents on the Microstructure and Other Characteristics of Process Cheese—A Review," *Food Microst.*, 4:297-312 (1985).
Friberg, S. and Larsson, K., *Food Emulsions*, 3rd Edition, Marcel Dekker Inc., New York, NY (1997).
Griffin, W., "Classification of Surface-Active Agents by 'HLB'", *J. Soc. Cosmetic Chemists*, 1:311-326 (1949).
Griffin, W., "Calculation of HLB Values of Non-Ionic Surfactants," *J. Soc. Cosmetic Chemists*, 5: 249-256 (1954).
Guinee et al., "Observations of the Microstructure and Heat-Induced Changes in the Viscoelasticity of Commercial Cheeses," *Aust. J. Dairy Technol.*, 54:84-89 (1999).
Hassan, A. et al., "Changes in the Proportions of Soluble and Insoluble Calcium During the Ripening of Cheddar Cheese," *J. Dairy Sci.*, 87:854-862 (2004).
Keller, B. et al., "Mineral Retention and Rheological Properties of Mozzarella Cheese Made by Direct Acidification," *J. Dairy Sci.*, 57:174-179 (1974).
Kosikowski, F., *Cheese and Fermented Milk Foods*, vol. 1, Origins and Principles, Westport, CT (1997).
Lee, S. et al., "Changes in the Rheology and Microstructure of Processed Cheese During Cooking," *Lebensm.-Wiss. U.-Technol.*, 36:339-345 (2003).
Lucey, J. et al., Rheological and Calcium Equilibrium Changes During the Ripening of Cheddar Cheese, *Int. Dairy J.*, 15:645-653 (2005).
Lucey, J., "Importance of Calcium and Phosphate in Cheese Manufacture: A Review," *J. Dairy Sci.*, 76:1714-1724 (1993).
Lucey, J. et al., "Invited Review: Perspectives on the Basis of the Rheology and Texture Properties of Cheese," *J. Dairy Sci.*, 86:2725-2743 (2003).
Metzger, L. et al., "Whiteness Change During Heating and Cooling of Mozzarella Cheese," *J. Dairy Sci.*, 83:1-10 (2000).
Mistry, V., "Low Fat Cheese Technology," *Int. Dairy J.*, 11:413-422 (2001).
Mizuno, R. and Lucey, J., "Effects of Emulsifying Salts on the Turbidity and Calcium-Phosphate-Protein Interactions in Casein Micelles," *J. Dairy Sci.*, 88:3070-3078 (2005).
Moonen, H. and Bas, H., "Mono- and Diglycerides," *Emulsifiers in Food Technology*, Whitehurst, ed. Blackwell Publishing, pp. 41-58 (2004).
Muthukumarappan, K. et al., "Estimating Softening Point of Cheese," *J. Dairy Sci.*, 82:2280-2286 (1999).
O'Mahony, J. et al., "A Model System for Studying the Effects of Colloidal Calcium Phosphate Concentration on the Rheological Properties of Cheddar Cheese," *J. Dairy Sci.*, 89:892-904 (2006).
Pereira, R. et al., "Rheological and Microstructural Characteristics of Model Processed Cheese Analogues," *J. Text. Studies*, 32:349-373 (2001).
Rao, M., *Rheology of Fluid and Semisolid Foods—Principles and Applications*, Aspen Publishers, Gaithersburg, MD (1999).

(Continued)

*Primary Examiner* — Leslie Wong
(74) *Attorney, Agent, or Firm* — Armstrong Teasdale LLP

(57) ABSTRACT

The present invention provides compositions and methods for preparing cheese with low fat content and with improved texture, color and baking properties. The compositions and methods of the invention include acidification of the cheese base and the addition of glycerides to manufacture processed or heated curd cheese with improved properties such as texture, stickiness, color and baking properties.

25 Claims, 8 Drawing Sheets

(56) References Cited

OTHER PUBLICATIONS

Shirashoji, N. et al., "Effect of Trisodium Citrate Concentration and Cooking Time on the Physicochemical Properties of Pasteurized Process Cheese," *J. Dairy Sci.*, 89:15-28 (2006).

St. Angelo, A. and Vercellotti, J., "Phospholipids and Fatty Acid Esters of Alcohols," *Food Emulsifiers: Chemistry, Technology, Functional Properties and Applications*, vol. 19., Charalambous and Doxastakis eds., Elsevier, London (1989).

Tunick et al., "Effects of Composition and Storage on the Texture of Mozzarella Cheese," *Neth. Milk Dairy J.*, 45:117-125 (1991).

International Search Report received in related PCT Application No. PCS/US2008/060501.

Examiner's Report for Australian Patent Application No. 2008242999 dated Aug. 27, 2012; 4 pages.

* cited by examiner

LOW-FAT AND FAT-FREE CHEESE WITH IMPROVED PROPERTIES

CROSS-REFERENCE TO RELATED APPLICATIONS

This invention claims priority to U.S. Provisional Patent Application Ser. No. 60/925,157, filed Apr. 17, 2007, which is herein incorporated by reference.

FIELD OF THE INVENTION

The present invention relates generally to the field of cheese manufacturing. More particularly, the present invention provides novel compositions and methods for preparing processed cheese with low fat or nonfat content and with improved color, texture, stickiness, and baking properties.

BACKGROUND

Although attempts have been made in the past to improve the quality of fat-free (non-fat) and low-fat cheese products, there are still a number of problems associated with these types of cheeses. These include pale or translucent color, tough or chewy texture, and poor melt and scorching/browning during baking (Tunick et al., 1991, *Neth. Milk Dairy J.* 45: 117-125). In addition, non-fat cheeses are often sticky; they stick to the manufacturing equipment, stick to other cheese such as on slices, or are sticky during consumption. These attributes are undesirable. Despite some improvements in the manufacture of processed cheese, for example as disclosed in U.S. Pat. Nos. 4,329,374; 4,459,313; 5,079,024; 5,225,220; and 5,374,443, the development of a high quality processed low-fat/non-fat cheese is desirable.

Monoglycerides (MG) and diglycerides (DG) are the most commonly used emulsifiers in the food industry and make up approximately 70% of the total world production of food emulsifiers. Monoglycerides and diglycerides are prepared by the interesterification of triglycerides (TG) with glycerol (Moonen and Hans, 2004, *Emulsifiers in Food Technology*, Whitehurst, ed. Blackwell Publishing, pp 41-58). Under alkaline conditions, the TG reacts with the glycerol at high temperatures (200-250° C.) resulting in a mixture of MG, DG and TG as well as a small proportion of unreacted glycerol. Commercial glyceride blends often contain about 45-55% MG, 38-45% DG, 8-12% TG and 1-7% free glycerol. Mono- and diglycerides are very efficient surfactants as they contain both hydrophilic and hydrophobic regions meaning that they are soluble in both oil and water.

Monoglycerides and diglycerides hold a GRAS status and are therefore generally recognized as safe for inclusion in food products. There are wide applications for MG and DG in the food industry. They are added to bakery products to act as dough conditioners and strengtheners, crumb softeners, and also to increase shelf life. In the dairy industry MG and DG have commonly been included in cheese spreads and ice cream, to impart a smoother and more uniform consistency. For example, U.S. Pat. No. 5,891,495 discloses the use of an oil-water emulsion of a diglyceride mixture, which mixture can also contain some monoglycerides, as an emulsion suitable as cream alternative for ice cream applications. However, a known problem is the fact that the addition of emulsifiers to processed cheese can bring about de-emulsification in the system, resulting in the formation of large pools of free oil during cheese cooking. Trace amounts (<0.2%) of emulsifiers have sometimes been added to some types of cheese products. Emulsifying salts or melting salts, such as sodium phosphates or citrates, are commonly used in process cheese and these salts disrupt caseins to help facilitate caseins acting as emulsifiers. These emulsifying salts are not true emulsifiers themselves.

When more than one surfactant is present in a system, they will compete for the interface. The surfactant that has the greatest ability to lower surface tension is preferentially adsorbed at the interface and if that surfactant is present at a sufficient quantity, it can prevent the adsorption of other surfactants. Low molecular weight products such as MG and DG are preferentially absorbed onto the interface over higher molecular weight surfactants, which in the case of milk is protein. This effect can be seen during ice cream production where MG and DG compete with proteins at the fat/water and the air/water interfaces.

It would be advantageous to develop new types of low-fat and/or fat-free processed cheese, with desirable textural attributes, color, and superior baking ability. The present invention addresses these and related needs.

BRIEF SUMMARY

Methods for making processed cheese are provided, which include acidifying a reduced-fat milk source to obtain a cheese base comprising particles, and adding glycerides to the cheese base, to obtain processed cheese. The methods may include acidifying a reduced-fat milk source to a pH of about 5.4 to 5.8 to obtain a cheese base comprising particles; and adding glycerides to the cheese base, the glycerides being about 0.4% to about 8% (w/w), glyceride weight to cheese base weight, to obtain processed cheese.

The methods may include heating the cheese base to between about 60° C. and about 85° C. prior to adding glycerides. The methods may include heating the cheese base to between about 60° C. and about 85° C. during adding glycerides. In some embodiments, the methods may include heating the cheese base from about 60° C. to about 85° C. after adding glycerides. The heating may be conducted for between about 2 min to about 12 min.

The methods may include the step of reducing the size of the particles of the cheese base prior to heating. The methods may include the step of adding water to the cheese base during heating.

In one example, the methods may include adding about 4% (w/w) glycerides to the cheese base, glyceride weight to cheese base weight.

The glycerides used in the practice of the methods may include monoglycerides and diglycerides. The glycerides may include about 40% to about 80% of monoglycerides and about 20% to about 60% of diglycerides. In one example, the glycerides include about 60% monoglycerides and about 40% diglycerides. The glycerides may be sequentially added to the cheese base.

In one embodiment, no emulsifying salts are needed in the making of the processed cheese. In one embodiment, the cheese base may be substantially free of whey. The methods may include the step of pasteurizing the cheese base prior to acidifying the reduced-fat milk source. The methods may include warming the reduced-fat milk source to between about 33° C. and 40° C. prior to acidifying. The methods may include warming of the reduced-fat milk source to between about 33° C. and about 40° C. during the acidifying. In one embodiment, the reduced-fat milk source is acidified to a pH of about 5.6. The acidifying may include adding citric acid.

The processed cheese may have a relative moisture content of about 54% to about 64%. In one embodiment, the processed cheese has a relative moisture content of about 59%. In one embodiment, the processed cheese has a sodium content of less than about 700 mg/100 g (0.7%) w/w. Also provided is processed cheese manufactured according to the methods of the present invention.

Methods of processed cheese manufacture are provided, which include the steps of acidifying a reduced-fat milk source to a pH of between about 5.4 and about 5.8 to obtain a cheese base comprising particles, and adding about 0.4% to about 8% (w/w) glycerides to the cheese base to obtain processed cheese. The glycerides may comprise about 40% to about 80% of monoglycerides and about 20% to about 60% of diglycerides.

Cheese product is provided, which contains less than about 0.7 wt. % sodium and between about 54 wt. % and about 64 wt. % moisture. The cheese product is obtained by acidifying a reduced-fat milk source to a pH of between about 5.4 and about 5.8, to obtain a cheese base comprising particles, and adding between about 0.4% to about 8% glycerides to the cheese base, glycerides weight per weight of the cheese base, to obtain the cheese product. The cheese product may be processed cheese.

DETAILED DESCRIPTION OF THE PRESENTLY PREFERRED EMBODIMENTS

Figure 1:
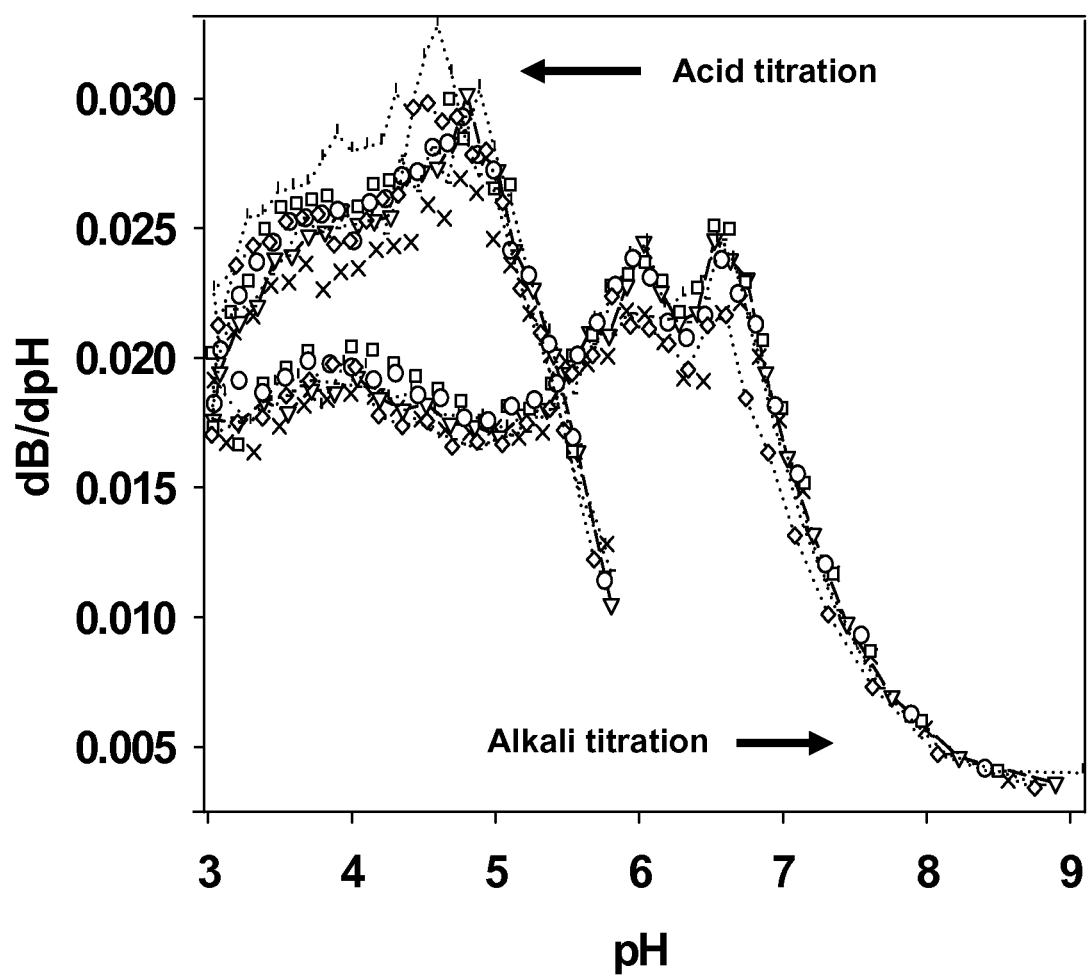
FIG. 1 is a graph showing acid-base buffering curves of non-fat cheese base (x), and the non-fat processed cheese (NFPC) containing 0% (∇), 0.1% (|), 0.5% (□), 1% (○), 2% (◇), and 4% (—) glyceride.

The present invention is particularly well-suited for use in manufacturing low-fat and fat-free cheeses with improved color, texture and baking properties. In one embodiment, the present invention relates to processed cheeses with low fat content (i.e., fat-free and low-fat cheeses) and to methods of preparing same. In another embodiment, the present invention is not limited to processed cheese, and is also well-suited for improving the texture of a variety of cheeses, such as heated curd cheeses including string cheese, Mozzarella, Provolone, and other cheeses.

"Low-fat" cheese refers to cheese that contains less than 6 g of fat per 100 g of cheese (i.e., less than 6% fat). "Fat-free" cheese (also called "non-fat" cheese) refers to cheese that contains less than 0.5 g fat per one serving of 28 g (i.e., less than 1.78% fat). Throughout this patent application, reference to "non-fat processed cheese" or "NFPC" is also meant to include both fat-free processed cheese and low-fat processed cheese, i.e. all processed cheese with less than 6 g of fat per 100 g of cheese (i.e., less than 6% fat). Throughout this patent application, reference to "reduced-fat milk" is meant to include low-fat milk, non-fat milk and skim milk.

In one embodiment, the present invention provides fat-free processed cheese with lower sodium content than other process cheeses since no sodium based emulsifying salts are used in the manufacture of process cheese according to the present invention. Typically, in the process of cheese manufacture, sodium is usually added in the form of some type of sodium salt.

The present invention provides fat-free processed cheese with desirable textural attributes, and an improved baking ability and methods to produce that cheese. Many of the problems associated with the quality of low-fat and fat-free cheeses, such as pale color, excessive stickiness, poor melt and scorching during baking, can be improved using the methods and compositions of the present invention. At least some of these problems can be overcome by altering the protein interactions in the fat-free cheese base through the addition of an oil/water emulsifier, in the form of glyceride blend, according to the methods of the present invention.

In one embodiment, the present invention is particularly well suited for processed cheese. "Processed cheese", or "process cheese", is a food product made from a source such as regular cheese and other unfermented dairy ingredients, and optionally may include one or more of emulsifiers, extra salt, and food colorings. Many flavors, colors, and textures of processed cheese exist. Examples of processed cheese include American cheese, Velveeta, and Laughing Cow. It is believed that the improvements in color, texture, stickiness and bake attributes are suited for all types or forms of process cheese including blocks, slice-on-slice, individually-wrapped-slices, and spreads. It is contemplated that the compositions and methods of the present invention will be particularly suited for the manufacture of low-fat and/or fat-free processed cheese for use in food chains, institutional settings, such as primary education institutions, and in general anywhere where the dietary and health requirements limit the types of foods that can be served.

In the present context, the term "cheese" may be any kind of cheese and it includes, but is not limited to, natural cheese, cheese analogues, and processed cheese. In one embodiment, the present invention is directed to methods and compositions for manufacturing low-fat and fat-free (non-fat) processed cheese. The cheese may be obtained using suitable processes known in the art, such as enzymatic coagulation of the cheese milk with rennet, or by acidic coagulation of the cheese milk with food grade acid or acid produced by lactic acid bacteria growth.

The manufacture of natural cheese generally includes four basic steps: coagulating, draining, salting, and ripening. Processed cheese manufacture generally incorporates extra steps, including grinding/grating, blending, and melting. In one embodiment, the method steps outlined herein can thus take the form of the same steps with variations during each step, the same steps with a variation in their order, special applications, or different ripening practices. Thus, embodiments of the methods of the present invention can be varied according to methods known in the art.

The milk source (starting material for processed cheese) may be, for example, natural cheese, whole milk or skim milk, homogenized or non-homogenized, filled (as with vegetable oil, such as cottonseed or corn oil) milk, or the like. In some examples, various types of reduced-fat milk, including but not limited to low-fat milk, non-fat milk, or skim milk, may be used as milk source, i.e. starting material. The milk source may optionally be refrigerated or cooled to about 4° C. before acidification as described below.

In one embodiment of the present invention, stirred curd cheese base is manufactured by direct acidification of milk. In another embodiment of the present invention, the cheese base is acidified to between about pH 5.4 to 5.8 with continuous agitation. In yet another embodiment of the present invention, the cheese base is acidified to about pH 5.6. Acidification may be performed according to methods known in the art, for example using citric acid as the acidifying acid. In another example, the acidifying acid may be lactic acid. A variety of calcium chelating acids may be used for acidification. Various organic and inorganic acids may be used for this purpose to the extent that they are permissible in food products including, for example, acetic, fumaric, malic, citric, phosphoric acid, and the like. Individual acids or lactones such as glucono-delta-lactone may also be used. Alternatively, mixtures of two or more acids or acids and other acidifying agents may be used. One or more additions of acid may be used to adjust pH. Curd particles are typically formed as the result of acidification. In one example of preparation of the cheese base, the cheese base may be warmed to a temperature of about 35° C. to about 40° C. for a period of time. For example, the cheese base may be warmed to a temperature of about 37° C. for a period of about 20 minutes. This step may be used to drive out some of the moisture from the cheese base. Rennet coagulant may be added to coagulate the curd.

In one embodiment of the present invention, no starter culture is used. However, the use of starter culture is optional. In some embodiments, the use of starter culture can be one way to provide acidification of the cheese base. Calcium chelating agents, for example citrate salts, can also be used to remove some calcium crosslinking material.

In one embodiment, the methods according to the present invention may further include reducing the particle size of the cheese base. Reducing the cheese base to small particles can be performed in a variety of ways according to methods known in the art, using, for example, milling, grinding, grating, shredding, and the like. A variety of mechanical cheese mills, grinders, graters, or shredders are known in the art.

Particles reduced in size or not, the cheese base, e.g. in the form of coagulated curd, is cooked. "Cooking" or "heating" refers to the processing step of heating the cheese base, or the cheese base with desired additives, emulsifiers, glycerides, glyceride blends, etc. Cooking can be accompanied by mixing, which helps disrupt the cheese matrix and disperse the caseins. Different cooking temperatures can be used. For example, cooking can be performed at a temperature of about 60° C. to about 85° C. In one example, the cooking temperature is about 70° C. Cooking can be performed for varying periods of time; this also depends on the type of cooker and rate of curd heating. In one cooking example, heating at about 60° C. to about 85° C. is carried out for a period of about 2 minutes to about 10 minutes. In another example, cooking is carried out at about 70° C. for a period of about 4 minutes. During cooking, after cooking, or both during cooking and after cooking, the processed cheese may be stirred. The processed cheese may be then poured into molds, it may be cooled, and it may be sliced if desired. The processed cheese may also be applied to chill rolls or other devices or equipment used to produce process cheese slices that are known to the industry. Both wet and dry cookers may be used for heating the curd/cheese.

There is no need for aging the processed cheese of the present invention. However, if desired, the manufactured cheese can be cooled, sliced, and packaged or packaged, cooled and later sliced. For example, molten cheese can be poured into 9 kg Wilson-style hoops and stored at 4° C. for 7 days before being used for consumption.

In one embodiment, the relative moisture content of the processed cheese product manufactured according to the present invention is between about 54% to about 64%, although processed cheese with other moisture content can be manufactured as well. In one embodiment, the relative moisture content of the processed cheese product is about 59%.

In one embodiment, the processed cheese of the present invention contains emulsifiers. An "emulsifier" is a substance which stabilizes an emulsion. In one embodiment, the emulsifiers used in the manufacture of the cheese of the present invention are glycerides.

Glycerides are esters formed from glycerol and fatty acids. Glycerol has three hydroxyl functional groups that can be esterified with one, two or three fatty acids to form monoglycerides, diglycerides, and triglycerides. A "monoglyceride" (MG) is a glyceride consisting of one fatty acid chain covalently bonded to a glycerol molecule through an ester linkage. A "diglyceride" (DG) is a glyceride consisting of two fatty acid chains covalently bonded to a glycerol molecule through ester linkages. The commercial source of mono- and diglycerides may be animal (e.g., cow- or hog-derived) or vegetable, and they may be synthetically made as well. Mono- and diglycerides are food additives that are found in bakery products, beverages, ice cream, chewing gum, shortening, whipped toppings, margarine, and confections.

In some embodiments, the present invention provides for the addition of glycerides to the cheese base. In one example, the glycerides are provided in the form of a glyceride blend. As used herein, the term "glyceride blend" refers to a composition that includes a mix of glycerides. The glyceride blend may include any combination of glycerides. For example, the glyceride blend may include any combinations of monoglycerides (MG), diglycerides (DG), and triglycerides (TG). In one example, the glyceride added to the cheese base may include combinations of monoglycerides and diglycerides present in different relative proportions.

The hydrophilic-lipophilic balance (HLB) of a surfactant is a measure of the degree to which it is hydrophilic or lipophilic, determined by calculating values for the different regions of the molecule (Griffin, 1949, *J. Soc. Cosmetic Chemists* 1: 311-326; Griffin, 1954, *J. Soc. Cosmetic Chemists* 5: 259-267). HLB is an arbitrary scale from 0 to 40 depicting the Hydrophilic/Lipophilic Balance of a surfactant. Products with low HLB are more oil soluble. High HLB represents good water solubility. Preferred blends of MG and DG have low HLB. Those skilled in art of using emulsifiers could possibly use other types of emulsifiers as long as they had a similar HLB value as mono/diglyceride blends described according to the present invention. Commercial blends of glycerides blend may include additional compounds, e.g. glycerin and wetting agents. In one example, distilled monoglycerides are used that have at least 90% of monoglycerides. Distillation is used to remove almost all TG and glycerin, leaving some DG.

In one example, stabilizers such as polysaccharide food gums may be added to the glycerides. Vegetable oils and animal fats can be used as glyceride sources, as these contain mostly triglycerides, which can be broken down by natural enzymes (e.g. lipases) into mono- and diglycerides and free fatty acids.

The order of addition of the glycerides is optional, if several different glyceride types are individually added. To make the glyceride blend, different glycerides may be added at different times, so that they are mixed with each other. Alternatively, to make the glyceride blend, different glycerides may be added simultaneously, so that they are mixed with each other. In one example, the monoglycerides and diglycerides can be added individually, sequentially, or they can be blended together as in commercial mono/diglyceride blends, and then added as glyceride blend during the manufacturing of the processed cheese of this invention.

Glycerides can be added at any time in the process of manufacturing processed cheese according to the present invention. Glycerides can be added at multiple times in the process of manufacturing processed cheese according to the present invention. In one example, the glycerides (e.g., MG and DG blend) can be added directly to the cheese base, during, after or prior to salting. In another example, glycerides (e.g., MG and DG blend) can be added during the cooking of the cheese base.

Not wanting to be bound by the following theory, it is possible that the added glycerides compete with caseins in the system to bind to either the hydrophilic or the hydrophobic regions of other caseins in the cheese matrix. The MG and DG are preferentially adsorbed due to their low molecular weight resulting in changes in the textural and functional properties of the low-fat and non-fat processed cheese. It is possible that the glycerides associate with the hydrophilic and hydrophobic regions of casein, thus altering casein functionality. Thus, the addition of glycerides according to the present invention is well-suited for improving the texture of a variety of cheeses, such as heated curd cheeses including string cheese, Mozzarella, and others. This texture improvement includes reduced skinning and chewiness of baked cheese as assessed by a trained sensory texture panel compared to cheese without glycerides.

The total amount of glycerides added to the cheese base during the manufacturing of processed cheese is in the range of about 0.4% to about 6% (w/w) relative to the amount of cheese base used. In some embodiments, amounts of about 4% glycerides (w/w) relative to the amount of cheese base are used. One way of measuring the amount of added glycerides relative to the cheese base is to measure the mass of the cheese base, and accordingly calculate and add the desired amount of glycerides (as percentage of weight of the cheese base, i.e., % w/w). For example, various levels (e.g., 0.1%, 0.5%, 1%, 2%, 4%, 5%, 6%, 7%, or 8% w/w) of a mono-/diglyceride blend can be added to the non-fat cheese base during non-fat processed cheese (NFPC) manufacture in a Blentech twin-screw cooker along with water to maintain final moisture content of about 59%. Many other types of cookers (for example, continuous cookers) are often used in the industry. The relative amounts of glycerides in the glyceride blend can vary. In different embodiments, a variety of MG:DG ratios in the glyceride blend can be used. They can range, e.g., from 1:99, 10:90, 20:80, 30:70, 40:60, 50:50, 60:40, 70:30, 80:20, 90:10, to 99:1, or any other ratio from 1:99 to 99:1 of MG:DG. In one example, the glyceride blend includes about 60% of MG and about 40% of DG (i.e., 60:40 of MG:DG). Thus, in one example the glyceride blend may include monoglycerides, diglycerides, and triglycerides. The amount of each of the monoglycerides, diglycerides, and triglycerides in the glyceride blend may vary. In another example, the glyceride blend may include monoglycerides and triglycerides. In yet another example, the glyceride blend may include diglycerides and triglycerides. Mono-diglycerides blends, e.g. glyceride blends produced from an esterification between triglyceride and glycerol, are commercially available. For example, glyceride blends in variations depending on the concentration of mono-diglyceride, typically ranging between 40% and 60%, are commercially available from Danisco (Copenhagen, Denmark), under the names of GRINDSTED® MONO-DI HP 60 and CREMODAN® Super.

The addition of glycerides and their incorporation into processed cheese according to this invention has very positive effects on low-fat and fat-free processed cheese during baking. The novel cheese compositions described herein exhibit desirable attributes, including whiteness in color when both heated and cooled, decrease in, or absence of, stickiness, minimal skinning on the melted cheese surface, and minimal browning or scorching. Thus, the novel cheese compositions described herein have improved one or more desirable attributes such as texture, stickiness, color, and/or baking properties. The concentration of glyceride in the low-fat and non-fat processed cheese has a direct impact on the chewiness and hardness of the cheeses when baked. Using methods known in the art, these sensory attributes can be easily regulated to suit customer preferences for the desired degree of chewiness and/or hardness/softness, and other desired organoleptic properties in the baked low-fat and non-fat processed cheese.

The process of manufacturing processed cheese may include various mixing, stirring, and/or agitating steps. These steps can be performed at any desirable point in time, and may help dispersion of the cheese, when mixing the cheese base and/or the processed cheese with any additives, e.g. with glycerides. For example, agitation can be beneficially maintained throughout the preparation of the processed cheese. At any point during the steps of making processed cheese, and preferably during the mixing steps, food additives such as various condiments, spices, table salt, coloring, sodium phosphate, calcium chloride, calcium phosphate, milk solids, flavorings (including cheese slurries), fruits, vegetables, meats, stabilizers, condiments, preservatives, vitamins, minerals, and the like, can be added depending upon the desired final attributes of the processed cheese product.

In some embodiments, the methods of the present invention may include the step of pasteurizing the cheese base. In other embodiments of the present invention, one or more enzymes, e.g., coagulating enzymes, lipases, or enzyme modified cheese may be used. In yet other embodiments of the present invention, fermenting bacteria may be used. Low levels (<6 g/100 g curd) of a milk fat source may also be added to the milk or to curd to improve bake performance if a low-fat cheese is being manufactured.

Water may be added during the process of manufacturing processed cheese. Water may be added at any point in time during the manufacture. Water may be added at multiple times. For example, water may be added before cooking; water may be added during cooking. In one example, water may be added both before cooking and during cooking. Water may also be used to adjust the relative moisture content in the processed cheese to a desired value.

In some embodiments, the methods and compositions of the present invention provide for the manufacture of processed cheese that can be used in slice-on-slice applications, where the slices of process cheese are stacked on top of each other without a plastic wrapping. One attribute of the processed cheese produced according to the present invention is that the cheese is relatively non-sticky, i.e., its low degree of surface stickiness allows for relatively easy removal of individual slices from a stack. As well, this cheese does not exhibit excessive stickiness to the cheese manufacturing equipment. The produced process cheese retains some fibrous texture which is also a desirable attribute. In contrast to other cheese processing methods, the methods of the present invention obviate the need for addition of lecithin or other compounds that decrease cheese stickiness, although, if desired, lecithin can still be used in some situations. The processed cheese of the present invention may be presented in a variety of shapes and forms, including individual portions, individual slices, individually wrapped slices, rectangular blocks, cylinders, tubes, and the like.

In some embodiments, the methods and compositions of the present invention provide for the manufacture of processed cheese with lower sodium levels than currently available process cheeses. It is not necessary to add sodium-based emulsifying salts, such as typically used citrates or sodium phosphates, during the manufacture of the non-fat processed cheese (NFPC) of the present invention. Thus, the amount of sodium is less than 700 mg/100 g whereas typical processed cheese has higher sodium levels of >1500 mg/100 g due to the addition of sodium-based emulsifying salts.

In some embodiments, the processed cheese made according to the present invention is substantially free of emulsifying salts. By "substantially free" of emulsifying salts is meant that no sodium- or potassium-based emulsifying salts are added during the manufacture of the processed cheese of the present invention. In milk there may be salts, such as citrates, phosphates, sodium and potassium salts, and some low amounts of emulsifying salts may be present in the processed cheese due to these salts that were derived from salts that were already present in the milk source used for making the cheese base. Most of the citrates, sodium and potassium ions are soluble and the majority of these salts should be lost in cheese whey. For example, typical citrate and phosphate levels in Cheddar cheese are around 0.3 and 0.55%, respectively. The processed cheese is still considered "substantially free" of emulsifying salts, even though there may be a small amount of emulsifying salts present in the processed cheese, if these emulsifying salts were present in the milk source that was used to obtain the cheese base according to this invention.

In some embodiments, the cheese base used to make cheese according to the present invention is substantially free of whey. By "substantially free" of whey is meant that the cheese base only contains the whey that was originally present in the cheese milk source used for curd manufacture and no added whey proteins were added to the milk or during curd manufacture or subsequent processing. For example, in one embodiment, the processed cheese may have a sodium level of less than about 700 mg/100 g (0.7%) whereas typical processed cheese has higher sodium levels of more than 1500 mg/100 g due to the addition of sodium-based emulsifying salts.

The amount of sodium chloride in process cheese can be regulated by altering the concentration of sodium chloride content in the cheese base. Sodium levels can also be reduced by the use of potassium chloride salts in blends with sodium chloride. The use of sodium-based emulsifying salts is avoided by the production of a cheese base that has suitable texture, color and functional properties as disclosed in the present invention.

When analyzing cheese properties, shear stress response (degree of deformation) measurements of the cheese can be conducted. Shear stress is a stress state where the stress is parallel or tangential to a face of the material. Shear rate is a measurement of the shear deformation. The shear stress measurement has two components: one in phase with the displacement or strain (elastic modulus, G') and one out of phase (loss modulus, G"). The ratio of G"/G' is known as the "tangent delta" (tangent of the phase angle) and is a measure of the relationship between the elastic and viscous natures of the cheese. In general, highly elastic cheeses (tangent delta less than 1) recover more quickly after a stress is imposed on the cheese.

When analyzing cheese properties, cheese viscosity measurements can be conducted to gain information on the overall thickness of the product. Viscosity is a measure of the resistance of the cheese to deform under shear stress. Viscosity is commonly perceived as "thickness", or resistance to flow. Viscosity describes a cheese's internal resistance to flow.

EXAMPLES

It is to be understood that this invention is not limited to the particular methodology, protocols, subjects, or reagents described, and as such may vary. It is also to be understood that the terminology used herein is for the purpose of describing particular embodiments only, and is not intended to limit the scope of the present invention, which is limited only by the claims. The following examples are offered to illustrate, but not to limit the claimed invention.

Cheese Base Manufacture

Stirred curd cheese bases were made from skim milk by direct acidification of cold milk (4° C.) using citric acid to attain a pH value of 5.6. Acid was added in several aliquots and once the target pH of the milk had been reached and maintained for approximately 30 min, $CaCl_2$ (18 ml/100 kg milk) was added to help improve the strength of the rennet coagulum. The milk was then warmed to 33° C., at which point rennet (Chymax Extra Double Strength, Chr. Hansen, Milwaukee, Wis.) was added a rate of 2 g/100 kg milk. When the coagulum was sufficiently firm, it was cut using 12.7 mm knives. The curd-whey mixture was then stirred as the temperature in the vat was increased from 33° C. to 37° C. over a 20 min period. Once the desired cheese base warming temperature (37° C.) was reached, the whey was completely drained from the vat. The curd was then dry salted at a rate of 1022 g/454 kg milk before being filled into 9 kg Wilson style hoops and pressed for 60 min at 275.8 kPa. Two 9 kg blocks of cheese were obtained from each vat. Cheese bases were manufactured at the desired pH value at least three times.

Fat-Free (Non-Fat) Processed Cheese Manufacture

Non-fat process cheese (NFPC) was manufactured using a Blentech twin-screw cooker (Blentech Corp., Rohnert Park, Calif.) equipped with direct and indirect steam injection. The cooker was preheated to 80° C. prior to addition of ingredients. The cheese base (immediately following removal from the press) was shredded using a mechanical cheese shredder and 9 kg of grated cheese base, water (to adjust the final moisture content of the process cheese to about 59%), and 0, 0.1, 0.5, 1, 2, or 4% glyceride (60% mono and 40% di blend from Danisco) were added to the cooker and mixed at a slow speed of 50 rpm for 40 s. The mix speed was then increased to 100 rpm and direct steam (about 82.7 kPa) was applied to the system for 100 s or until the temperature of the molten cheese reached about 60° C. Indirect steam (about 193 kPa) was then used to further increase the temperature of the mix to 70° C. Once this temperature was reached the heat was turned off and the processed cheese was held at 70° C. for 4 min. Vacuum pressure (about 1.4 kPa) was applied following the holding time for a total of 15 s to help remove air bubbles, and the mixer was switched off after 10 s of vacuum. The molten cheese was then poured into 9 kg Wilson style hoops, and stored at 4° C. Analysis was carried out on the NFPC following 7 days of storage. Non-fat processed cheese making was performed in triplicate.

Compositional Analysis

Both the cheese base and the NFPC were analyzed for moisture, according to IDF, 1982, *Determination of Total Solids of Cheese and Processed Cheese*, 4A, International Dairy Federation, Brussels, Belgium. The pH values of both the cheese base and the NFPC were analyzed by direct insertion of the probe into the cheese samples, using a pH meter 420A, Orion Research, Beverly, Mass. The cheese base and the NFPC were analyzed for amount of protein using the Kjeldahl method, as described in IDF, 1986, *Determination of Nitrogen Content (Kjeldahl Method) and Calculation of Crude Protein Content*, 20A, International Dairy Federation, Brussels, Belgium. The cheese base and the NFPC were analyzed for fat, as described in Marshall, 1992, *Standard Methods for the Examination of Dairy Products*, 16th ed., American Public Health Association, Washington D.C. The cheese base and the NFPC were analyzed for total calcium using the method described by Mizuno and Lucey, 2005, *J. Dairy Sci.* 88: 3070-3078, and also for insoluble calcium using the acid-base buffering method described by Hassan et al., 2004, *J. Dairy Sci.* 87: 854-862. Soluble calcium was measured using the water extraction method described by Shirashoji et al., 2006, *J. Dairy Sci.* 89: 15-28. The pH 5.6 cheese base was analyzed after 1 day of storage while the NFPC samples were analyzed after 7 days of storage. All analyses were carried out in triplicate.

Texture Profile Analysis and Uniaxial Compression

Cylindrical samples (16 mm diameter, 17.5 mm height) of the NFPC were taken, placed in a sealed plastic bag and stored overnight at 4° C. Texture profile analysis (TPA) and uniaxial compression were measured using a Texture Analyser TA-XT2 (Stable Micro Systems, Godalming, Surrey, UK). For TPA, the NFPC samples were compressed twice to 80% of their original height. Hardness, adhesiveness and chewiness were calculated as described by Bourne, 1978, *Food Technol.* 32: 62-66. For uniaxial compression, the NFPC samples were compressed once to 20% of their original height. Measurements were performed at least six times and tests were carried out at 4° C.

Meltability

A cylindrical sample (30 mm diameter, 7 mm height) was taken from the NFPC, placed in a sealed plastic bag and stored overnight at 4° C. The extent of flow (EOF), i.e., cheese height as a % of initial cheese height when cheese was heated to 60° C. in an oven set at 72° C., was measured using the UW-Melt Profiler that was described by Muthukumarappan et al., 1999, *J. Dairy Sci.* 82: 2280-2286.

Sensory Analysis

The NFPC (200 g) were grated, added onto a pizza base and baked in a convection oven (Bakers Pride Foodservice Solutions, Derbyshire, UK) at 232° C. for 12 min. Trained panelists (at least ten) were asked to evaluate the baked pizzas at 91° C. for skinning and force to stretch, at 68° C. for chewiness and cohesiveness, and finally at 52° C. for hardness. Sensory analyses were carried out on the NFPC following 14 days storage at 4° C. Sensory tests were replicated 3 times.

Rheological Analysis

Rheological properties of the NFPC were measured by low amplitude strain oscillation on a dynamic small amplitude oscillatory rheometer (Paar Physica UDS 200; Anton Paar, Ashland, Va.) as described by Lucey et al., 2005, *Int. Dairy J.* 15: 645-653. Cheese discs (50 mm diameter, 3 mm thick) were subjected to a low amplitude shear strain of 0.005 at an angular frequency of 0.08 Hz. Temperature was increased from 5° C. to 85° C. at a rate of 1° C./min. The parameters recorded were elastic shear modulus (G') and tangent delta (TD). Each sample was analyzed at least four times.

Viscosity

Changes in the viscosity (Pa·s) of the NFPC on heating from 25° C. to 70° C. followed by cooling from 70° C. to 45° C. were measured using a dynamic small amplitude oscillatory rheometer (Paar Physica UDS 200, Anton Paar, Ashland, Va.). A vane measuring system (FL100) with cup attachment and peltier heating was used to test the NFPC. Twenty-two grams of grated pH 5.6 cheese base along with water (to adjust the final moisture content of the process cheese to about 59%) and glycerides were mixed and weighed into the cup system for analysis. The vane measuring system was lowered into the cup and the sample was first heated from 25° C. to 50° C. in 12.5 min and held at 50° C. for 15 s. At this point the rotation of the vane measuring system began at a shear rate of 0-50 1/s. The sample was further heated from 50° C. to 70° C. in 10 min at a shear rate of 1 1/s and held at this temperature and shear rate for 4 min. The sample was cooled from 70° C. to 45° C. in 12.5 min still maintaining the shear rate as before. The change in the viscosity of the sample was determined during both the heating and cooling cycles of the test.

Suitability of Cheese for the Production of Slices

Approximately 30 g of hot molten process cheese was taken directly from the processed cheese cooker immediately following processing. The molten cheese was spread between two plastic sheets as a thin layer (about 5 mm) and stored at −20° C. for about 15 min. Cheeses were then handled to determine their stickiness to the plastic sheets, stickiness when placed on other slices of cheese and textural attributes such as brittleness were subjectively evaluated by an experienced cheese grader.

Statistical Analysis

ANOVA was carried out using the SAS program (SAS System for Windows Release 6.12, 1999, SAS Institute, Inc., Cary, N.C.). The level of significant difference was determined at $P<0.05$.

Transmission Electron Microscopy

Two $mm^3$ samples were removed from the centre of the cheese block and immersion fixed overnight (ON) in 2.5% glutaraldehyde buffered in 0.1 M sodium cacodylate buffer (CB) at 4° C. Primary fixed samples were rinsed 5×5 minutes in CB, and post-fixed in 4% osmium tetroxide in 0.1 M CB for 1 hour at room temperature (RT), and rinsed in CB as before. Subsequent to fixation, the samples were dehydrated in a graded series of ethanol (EtOH) at the increasing percentages 35%, 50%, 70%, 80%, 90% for 5 minutes, 95% for 10 minutes, and 100% for 3×10 minutes at RT. Propylene oxide (PO) was used as a transition solvent 2×7 minutes at RT. Fully dehydrated samples were infiltrated in increasing concentrations of PolyBed 812 (Polysciences Inc., Warrington, Pa.) and propylene oxide mixtures, in the order shown in Table 1.

TABLE 1

Summary of infiltration of samples during embedding

| PolyBed 812 | PO | Time | Temperature |
|---|---|---|---|
| 25% | 75% | ON | RT |
| 33% | 66% | ON | RT |
| 50% | 50% | ON | RT |

TABLE 1-continued

Summary of infiltration of samples during embedding

| PolyBed 812 | PO | Time | Temperature |
|---|---|---|---|
| 75% | 25% | ON | RT |
| 85% | 15% | ON | RT |
| 90% | 10% | ON | RT |
| 100% | 0% | ON | RT |
| 100% | 0% | 4 × 45 min | 60° C. |

Embedding took place in fresh PolyBed 812 for 48 hours at 60° C. Fully polymerized embedded samples were sectioned on a Leica EM UC6 ultramicrotome at 80 nm. The sections were collected on Pioloform (Ted Pella, Inc., Redding, Calif.) coated 2×1 oval slot grids and bare 300 mesh Cu thin-bar grids (EMS, Hatfield, Pa.), and post-stained in uranyl acetate and lead citrate. The sectioned samples were viewed at 80 kV on a Philips CM120 or JEOL100CX microscope, both equipped with MegaView III camera (Olympus Soft Imaging System, Lakewood, Colo.).

Compositional and Chemical Analyses

The results for the pH 5.6 cheese base compositional analyses are shown in Table 2 while the results for the NFPC can be found in Table 3. The moisture content of the NFPC was adjusted to about 58% during manufacture through the addition of water. There were no significant differences in the pH values for NFPC indicating that glyceride (MG/DG 60:40 blend) addition did not have the ability to bring about changes in the pH of the different NFPC. The fat content of the pH 5.6 base was very low, around 0.99%. The fat content of the NFPC increased with the amount of glyceride added as expected (Table 3). According to the FDA's Guide to Nutrition Labeling and Education Act (NELA) requirements, at low glyceride levels the fat levels recorded would classify the cheeses in question as non-fat and at higher glyceride levels the cheese would be classified as low-fat. The concentration of sodium found in the cheese base was low and depended on the choice of the cheesemaker for amounts to be added during salting of curd base, and seeing as no sodium salts were added during NFPC manufacture, the sodium content remained low, typically around 700 mg/100 g (0.7%) w/w, whereas typical processed cheese has higher sodium levels of >1500 mg/100 g (1.5%) w/w due to the addition of sodium-based emulsifying salts.

TABLE 2

Typical compositional data for the pH 5.6 cheese bases

| Sample | pH | Moisture (%) | Protein (%) | Fat (%) | Calcium (mg/100 g cheese) |
|---|---|---|---|---|---|
| pH 5.6 Base | 5.57 ± 0.02 | 57.3 ± 0.4 | 35.3 ± 0.5 | 1.0 ± 0.1 | 381 ± 13.2 (Sol. 39 ± 3.7) |

Data are means ± standard deviation.

Citric acid was the acidulant used to preacidify the cheesemilk to the target cheese base pH of 5.6. Citric acid was chosen as the acidulant due to its ability to chelate calcium (Ca) from the colloidal calcium phosphate (CCP) crosslinks in the cheese matrix, resulting in the solubilization of CCP and a reduction in cheese hardness. When citric acid is used as an acidulant, it yields softer cheeses than when phosphoric, acetic, hydrochloric, or malic acids are used (Keller et al., 1974, J. Dairy Sci. 57: 174-179). The Ca chelating ability of citric acid in combination with the reduction in the pH of the cheesemilk to pH 5.6 resulted in a lower level of total Ca in the non-fat cheese base. Glyceride addition had no effect on the levels of soluble Ca present in the NFPC (Table 3).

TABLE 3

Compositional data for the NFPC Processed Cheese Composition

| Glyceride Levels (%) | Moisture (%) | pH | Protein (%) | Fat (%) | Total Calcium (mg/100 g cheese) | Soluble Calcium (mg/100 g cheese) |
|---|---|---|---|---|---|---|
| 0 | 58.3 ± 0.8 | 5.55 ± 0.01 | 31.9 ± 2.1 | 1.14 ± 0.21 | 390 ± 23 | 39 ± 3.2 |
| 0.1 | 58.2 ± 0.7 | 5.56 ± 0.02 | 30.9 ± 0.5 | 1.21 ± 0.20 | 374 ± 10 | 39 ± 3.5 |
| 0.5 | 58.1 ± 0.1 | 5.58 ± 0.02 | 30.7 ± 0.4 | 1.54 ± 0.16 | 380 ± 36 | 38 ± 3.0 |
| 1.0 | 58.5 ± 1.1 | 5.57 ± 0.01 | 30.7 ± 0.3 | 1.97 ± 0.18 | 390 ± 11 | 36 ± 3.5 |
| 2.0 | 58.7 ± 1.0 | 5.59 ± 0.02 | 30.9 ± 0.4 | 2.73 ± 0.18 | 386 ± 31 | 35 ± 0.5 |
| 4.0 | 59.2 ± 0.6 | 5.58 ± 0.03 | 30.1 ± 0.6 | 4.27 ± 0.14 | 385 ± 27 | 35 ± 2.4 |

Data are means ± standard deviation.

The acid-base buffering curves for the non-fat cheese base and the NFPC containing increasing levels of glyceride can be found in FIG. 1. In this experiment, titration was performed from initial curd pH to pH 3.0 with 0.5 N HCl, and titration from pH 3.0 to pH 9.0 with 0.5 N NaOH. Data points are means of three replicates. dB/dpH is a buffering index, which illustrates the resistance to buffering. dB is the volume (ml) of acid or base added, multiplied by the normality of the acid or base added; dpH is the volume of sample (ml), multiplied by the pH change produced.

The peak present at about pH 4.8 which is caused by the solubilization of CCP in the system does not appear to be affected by the addition of glyceride to the NFPC. A split in the peak at about pH 6.0 found during the back titration with 0.5 N NaOH can be clearly seen. This type of peak has been identified as the formation of insoluble Ca phosphate (Lucey and Fox, 1993, J. Dairy Sci. 76: 1714-1724). The split found in this peak may be due to the small amounts of citrate remaining in the cheese system following whey drainage competing with the phosphate present to complex with the soluble Ca in the serum phase of the cheese. However, the split in the peak occurs at pH 6.4 and therefore may also be partly as a result of citric acid remaining in the cheese buffering at this pH as citric acid has a pKa of about 6.4.

Cheese Color

The pH 5.6 non-fat cheese base was translucent in color, a common problem associated with non-fat and low-fat cheeses. The translucent straw-like color found in non/low fat cheeses might occur due to changes in light scattering caused by the very low fat levels in the cheese system (Kosikowski and Mistry, 1997, *Cheese and Fermented Milk Foods*, Vol. 1, Origins and Principles, Westport, Conn.). The translucency of the pH 5.6 base could also be attributed to the formation of a matrix that is fine-stranded which allowed light to pass through the cheese matrix.

The addition of glycerides resulted in improvements in the color of the NFPC. As the glyceride concentration was increased in the NFPC, the cheese color became whiter with the NFPC containing 4% glyceride having a desirable creamy white color. Not wanting to be bound by the following theory, this could be due to an increased number of interactions in the cheese scattering light or the added glycerides may have altered the protein interactions present in such a way to cause a change in the light scattering in the system and the occurrence of a whiter color in the cheese.

Rheological Analysis

Figure 2:
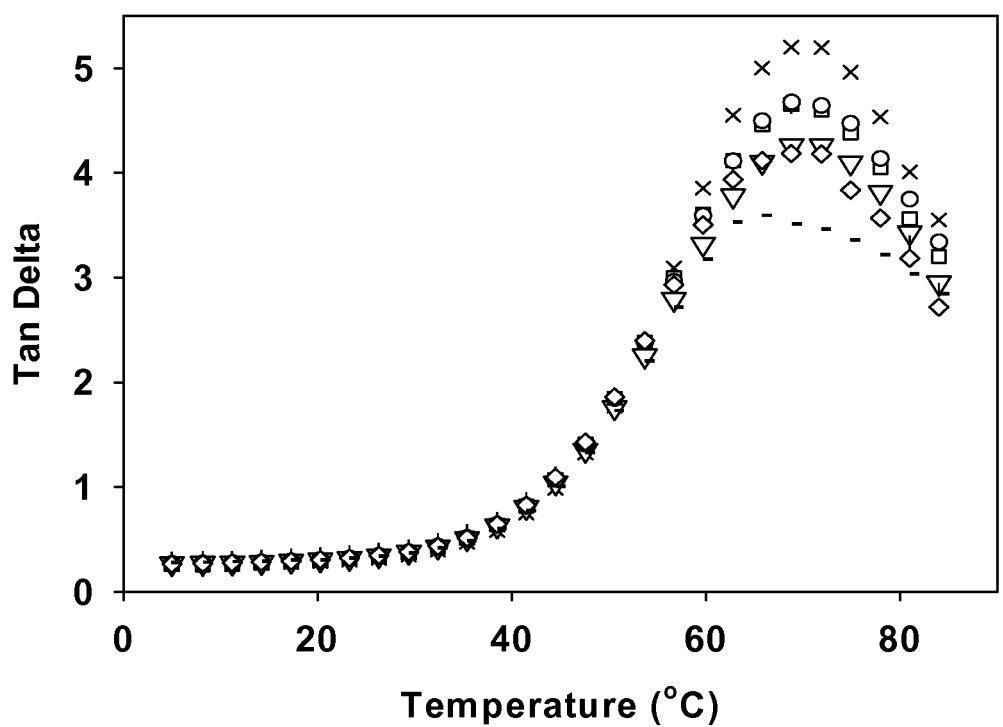
FIG. 2 is a graph illustrating the tangent delta for the non-fat cheese base (x), and the NFPC containing 0% (∇), 0.1% (|), 0.5% (□), 1% (○), 2% (◇), and 4% (—) glyceride on heating from 5° C. to 85° C. at a rate of 1° C./min and a frequency of 0.08 Hz.
Figure 3:
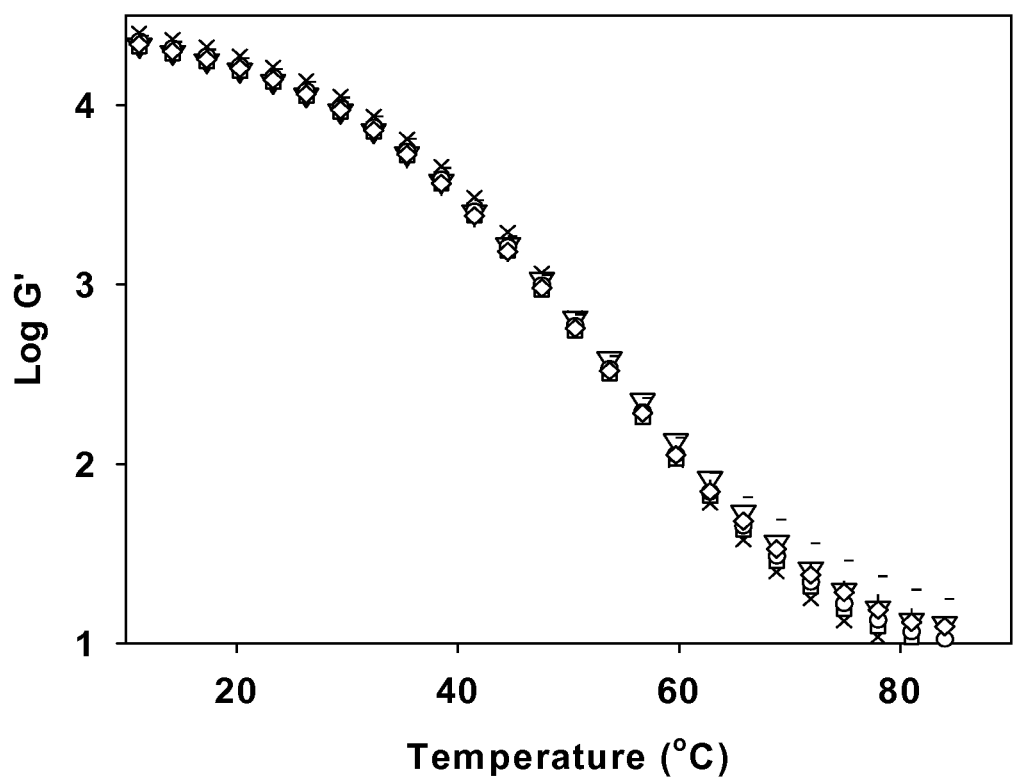
FIG. 3 is a graph illustrating the storage modulus for the non-fat cheese base (x), and the NFPC containing 0% (∇), 0.1% (|), 0.5% (□), 1% (○), 2% (◇), and 4% (—) glyceride on heating from 5° C. to 85° C. at a rate of 1° C./min and a frequency of 0.08 Hz.

Tangent delta (TD) and G' results recorded for the pH 5.6 cheese base and the NFPC can be seen in FIGS. 2 and 3. Samples were heated from 5° C. to 85° C. during which time a steady decrease in G' was evident. The decrease in G' represents a reduction in the solid-like properties of the sample and therefore a reduction in the hardness of the cheese (Guinee et al., 1999, *Aust. J. Dairy Technol.* 54: 84-89). Characteristically, G' decreased and TD increased very slowly up to about 40° C., following which G' decreased and TD increased rapidly up to about 70° C. At temperatures>40° C. any fat present in the system is in its liquid state. Therefore any changes occurring at temperatures>40° C. can be attributed to changes that may be occurring in the casein-casein interactions in the cheese bringing about a softening in the cheese structure (Lucey et al., 2003, *J. Dairy Sci.* 86: 2725-2743).

Tangent delta reached a maximum at about 70° C. for both the pH 5.6 cheese base and the NFPC. The higher the maximum TD is, the greater the propensity of the cheese to flow when heated, and therefore the softer the cheese is at high temperatures (O'Mahony et al., 2006, *J. Dairy Sci.* 89: 892-904). All NFPC showed a reduction in their maximum TD compared with the pH 5.6 base indicating more solid-like properties in the cheeses. As the glyceride concentration was increased in the NFPC a further reduction in maximum TD was observed. FIG. 3 also shows that at high temperatures, G' values for the NFPC containing 4% glyceride are slightly higher than G' values recorded for all other NFPC again signifying an increase in cheese firmness. The data points in FIG. 3 are means of 5 replicates.

Hydrophobic interactions play a very important role in the interactions of proteins, which is especially significant in the protein dense system being studied here. It has been well documented that as the temperature of a system increases, there is an increase in the strength of hydrophobic interactions present with a maximum reached at between 60° C. and 70° C. (Bryant and Clements, 1998, *Trends Food Sci. Technol.* 9: 143-151). There is also an increase in number of available hydrophobic binding sites in the NFPC due to the inclusion of the surface active glycerides with the number of binding sites increasing as the concentration of glycerides in the NFPC was increased. Glyceride concentrations>1% were necessary to bring about significant reductions in maximum TD, which agrees with previous observations that a surfactant must be present in sufficient quantity in order for it to be preferentially adsorbed at the interface (Friberg and Larsson, 1997, *Food Emulsions*, 3rd Edition, Marcel Dekker Inc., New York, N.Y.). Therefore, the decrease in the maximum TD and the higher G' values in NFPC containing>1% glyceride could be due to an increase in the number and strength of hydrophobic interactions in the system. The reduction in maximum TD for the NFPC containing>1% glyceride addition may, however, be due to the possible occurrence of protein dense regions in the cheese structure. Not wanting to be bound by the following theory, the addition of glycerides may have resulted in proteins clustering together into dense regions. Transmission electron micrographs (FIG. 6g) showed that in some cases glycerides interacted with one another, which could in turn have promoted protein aggregation in the cheese matrix.

Viscosity Measurements

Figure 4:
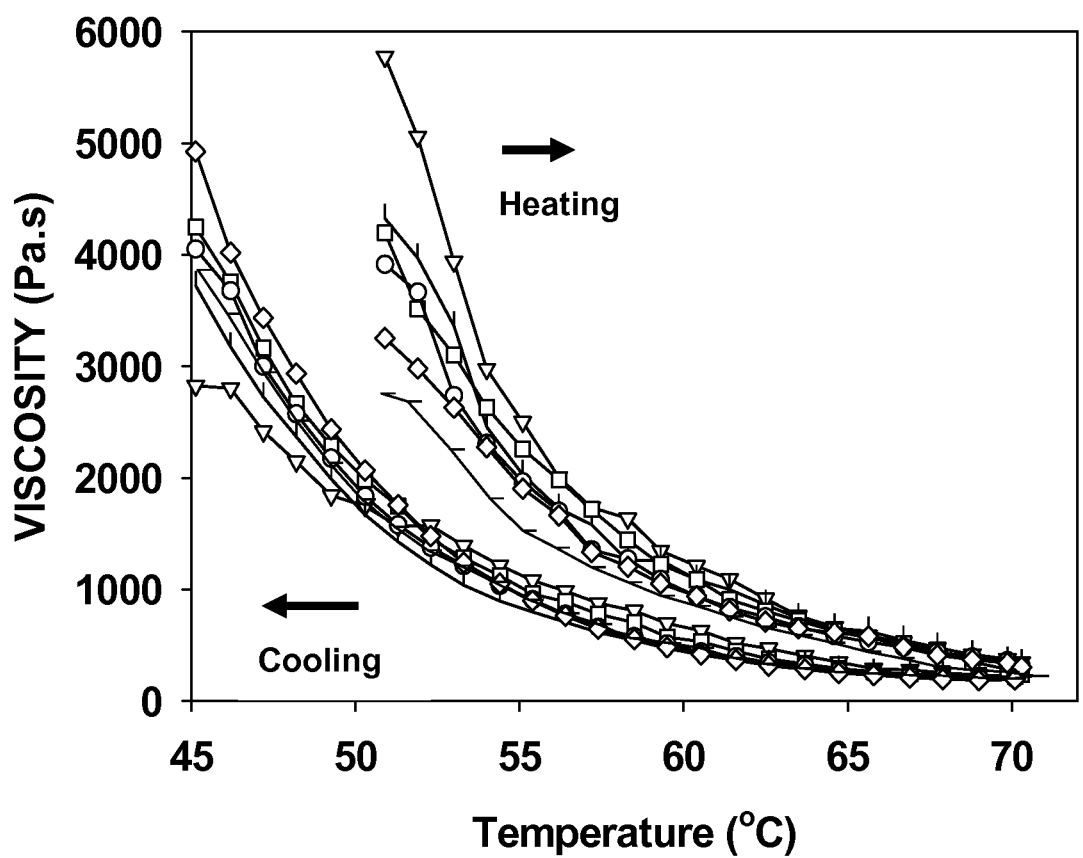
FIG. 4 is a graph illustrating the viscosity as a function of temperature for the NFPC manufactured containing 0% (∇), 0.1% (|), 0.5% (□), 1% (○), 2% (◇), and 4% (—) glyceride on heating from 50° C. to 70° C. and cooling from 70° C. to 45° C. at a rate of 2° C./min and a shear rate of 1 1/s.

The viscosity recorded as a function of temperature for the NFPC can be seen in FIG. 4. Data points are means of 5 replicates. Samples containing increasing concentrations of glycerides were mixed using a vane apparatus while being heated from 25-70° C. following which the samples were cooled from 70-45° C. The viscosity of the cheese was recorded during both the heating and the cooling cycles. This experiment was designed to simulate the heating step in a processed cheese cooker and the subsequent cooling of the processed cheese following cooking. The fat content of processed cheese is not essential to changes taking place in viscosity, such as creaming (Lee et al., 2003, *Lebensm.-Wiss. U.-Technol.* 36: 339-345). Therefore changes can be attributed to rearrangement taking place in the protein network.

Figure 6:
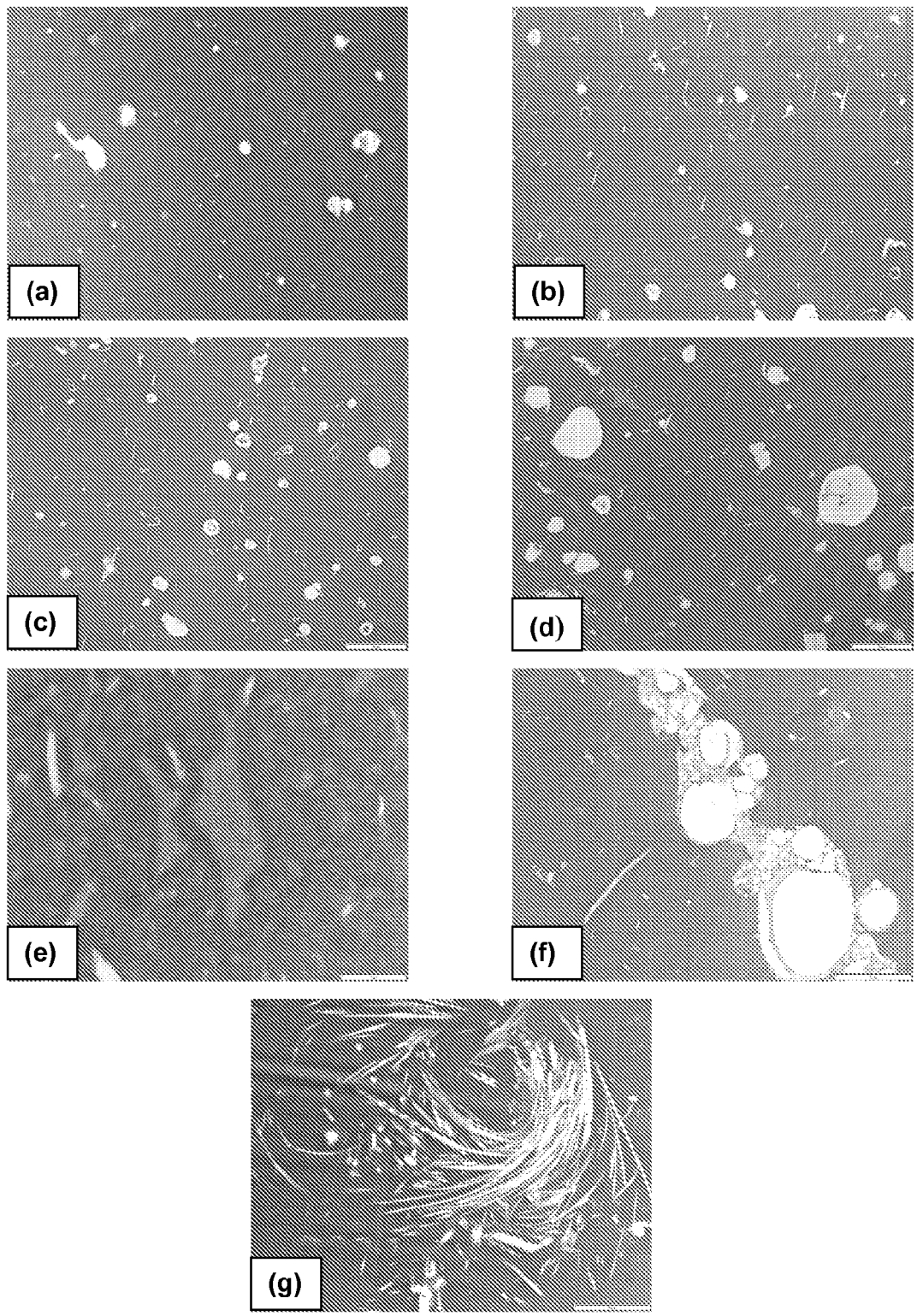
FIG. 6 shows images of transmission electron micrographs for the NFPC made with: (a) 0.1% glyceride, (b) 1% glyceride, (c) 2% glyceride and (d) 4% glyceride.

As the temperature was increased, a decrease in the viscosity of the samples was observed. Since viscosity is a measure of the resistance of a fluid to deform under stress (Rao, 1999, *Rheology of Fluid and Semisolid Foods—Principles and Applications*, Aspen Publishers, Gaithersburg, Md.), it can be deduced that a decrease in viscosity in this instance signifies a decrease in resistance in the cheese system and a reduction in the elastic properties present. As the concentration of the glyceride was increased in the NFPC, there was a decrease in the viscosity of the samples at 50° C. indicating a softer, more meltable structure in those NFPC containing higher levels of glyceride. Increased glyceride levels in the NFPC resulted in an increase in the level of competition between the glyceride and the proteins present to bind to the hydrophilic/hydrophobic sites on other proteins in the cheese matrix. This competing effect could have brought about a type of casein dispersion in the system during the heating cycle resulting in a softer, less viscous structure. However, upon cooling of the NFPC, the viscosity begins to increase for all levels of glyceride additions, signifying a reorganization of the structure to a firmer NFPC. The increase in viscosity (at about 45° C.) was greater for the NFPC containing glycerides than for the NFPC with no glyceride additions, indicating that during cooling a difference in the reorganization of the structures occurred. The micrographs in FIG. 6 show that the NFPC containing glycerides have a highly connected structure with several types of interactions taking place (casein-casein, casein-glyceride, and glyceride-glyceride). The connected nature of the structures could explain the increase in viscosity seen for the NFPC with added glyceride.

Meltability

The % extent of flow and the softening temperatures for the pH 5.6 cheese base and the NFPC can be seen in Table 4. All the NFPC were found to have improved flow and a decreased softening temperature (started to flow at lower temperatures) when compared with the pH 5.6 cheese base. The increased flow in the NFPC with no added glyceride can be attributed to the increased moisture content (Table 3) in the cheese (Pereira et al., 2001, *J. Text. Studies* 32: 349-373). No significant difference was found in the % extent of flow values recorded for the NFPC containing≤1% glyceride. However, at levels having >1% addition of glycerides, an increase in NFPC meltability was observed. This can again be attributed to the competing effect occurring between the glycerides and the caseins resulting in casein dispersion, a plasticizing influence of glycerides on caseins, and increased melt in the system.

TABLE 4

Percentage extent of flowability (EOF) and softening temperatures for the non-fat cheeses base and the NFPC manufactured therefrom as determined using the UW-Meltprofiler

| % Glyceride | EOF (%) | Softening temp. (° C.) |
|---|---|---|
| pH 5.6 Base | 65.5 ± 5.5$^a$ | 44.5 ± 0.9$^a$ |
| 0 | 71.1 ± 4.6$^b$ | 42.0 ± 1.7$^{ab}$ |
| 0.1 | 72.3 ± 2.8$^b$ | 42.1 ± 1.0$^{ab}$ |
| 0.5 | 71.6 ± 2.6$^b$ | 42.1 ± 1.2$^{ab}$ |
| 1 | 71.8 ± 1.9$^b$ | 42.7 ± 0.8$^b$ |
| 2 | 74.4 ± 2.0$^{bc}$ | 40.8 ± 0.3$^b$ |
| 4 | 77.9 ± 1.8$^c$ | 42.8 ± 0.3$^{ab}$ |

Superscripts with different letters in the same row are significantly different (P < 0.05). Data are means ± standard deviation.

FIG. 2 also shows data illustrating the tangent delta for the non-fat cheese base and the non-fat processed cheese. The data points in FIG. 2 are means of 5 replicates. The results exemplified in FIG. 2 and Table 4 agree with those reported for viscosity measurements where increased glyceride levels resulted in a decrease in NFPC viscosity. However, these results follow the opposite trend to that observed during rheological experiments where, at high temperatures, maximum TD was reduced for NFPC containing>1% glyceride addition (FIG. 2). This effect was attributed to an increase in the number and strength of hydrophobic interactions, the occurrence of protein dense regions in the cheese matrix, or the reduction in casein mobility due to their association with glycerides. It is important to point out that rheological experiments are small deformation tests while the viscosity and meltability measurements were large deformation tests where plasticizing properties of glycerides may be important. In other words, the structure strengthening effects are most likely not detectable under the conditions of the large strain tests due to the unrecoverable structural deformation which occurs in the samples.

Texture Profile Analysis and Uniaxial Compression

The hardness, adhesiveness, and chewiness values for the pH 5.6 cheese base and the NFPC as determined by texture profile analysis (TPA) are shown in Table 5. A significant decrease in hardness was observed for the NFPC with no glyceride addition compared with the pH 5.6 cheese base, which was probably due to the elevated moisture in the NFPC diluting the protein network and to the disruption of some bonds in the system during cooking that were not recovered in the NFPC. Upon addition of glycerides to the NFPC, an increase in the hardness of the NFPC was observed. These hardness levels remained relatively constant for the NFPC with added glycerides with the exception of the NFPC containing 2% glyceride. Hydrophobic interactions in the cheese system would not play an important role here as they have a maximum strength at temperatures between 60° C. and 70° C. (Bryant and Clements, 1998, *Trends Food Sci. Technol.* 9: 143-151) and so at the temperatures used in this experiment (4° C.), these interactions would be extremely weak. The increased hardness in the NFPC containing glycerides can, however, be attributed to the fact that the structures of these NFPC are highly connected resulting in a firmer cheese.

TABLE 5

Adhesiveness, hardness and chewiness values for the non-fat cheese base and the NFPC manufactured therefrom as determined by TPA

| % Glyceride | Hardness (g) | Adhesiveness (g/s) | Chewiness |
|---|---|---|---|
| pH 5.6 Base | 679 ± 24$^a$ | -1.7$^a$ | 335 ± 14$^a$ |
| 0 | 529 ± 35$^d$ | -1.4$^a$ | 241 ± 49$^c$ |
| 0.1 | 675 ± 68$^a$ | -1.0$^a$ | 250 ± 61$^c$ |
| 0.5 | 660 ± 31$^{ab}$ | -2.5$^a$ | 318 ± 66$^{ab}$ |
| 1 | 636 ± 57$^{bc}$ | -1.5$^a$ | 336 ± 37$^a$ |
| 2 | 485 ± 48$^e$ | -2.6$^a$ | 200 ± 41$^c$ |
| 4 | 654 ± 63$^b$ | 0.7$^a$ | 333 ± 30$^a$ |

Superscripts with different letters in the same row are significantly different (P < 0.05). Data are means ± standard deviation.

A positive relationship existed between hardness and chewiness for the pH 5.6 cheese base and the NFPC. As the hardness of the sample increased, an increase in sample chewiness was also observed. Chewiness has been defined as a product of hardness, adhesiveness and springiness (Bourne, 1978, *Food Technol.* 32: 62-66) and so changes in hardness would have a direct effect on sample chewiness. The pH 5.6 cheese base and the NFPC had very low adhesiveness levels and thus were not sticky. This is very important in non-fat cheese technology as stickiness has previously been identified as one of the major flaws occurring in non-fat and low-fat cheeses (Mistry, 2001, *Int. Dairy J.* 11: 413-422). When stirred curd cheese bases were manufactured by direct acidification of skim milk with lactic acid to pH 5.2 and 5.4, both the pH 5.2 and 5.4 cheese bases were found to be sticky. In contrast, the pH 5.6 cheese base of the present invention was not sticky.

Figure 5:
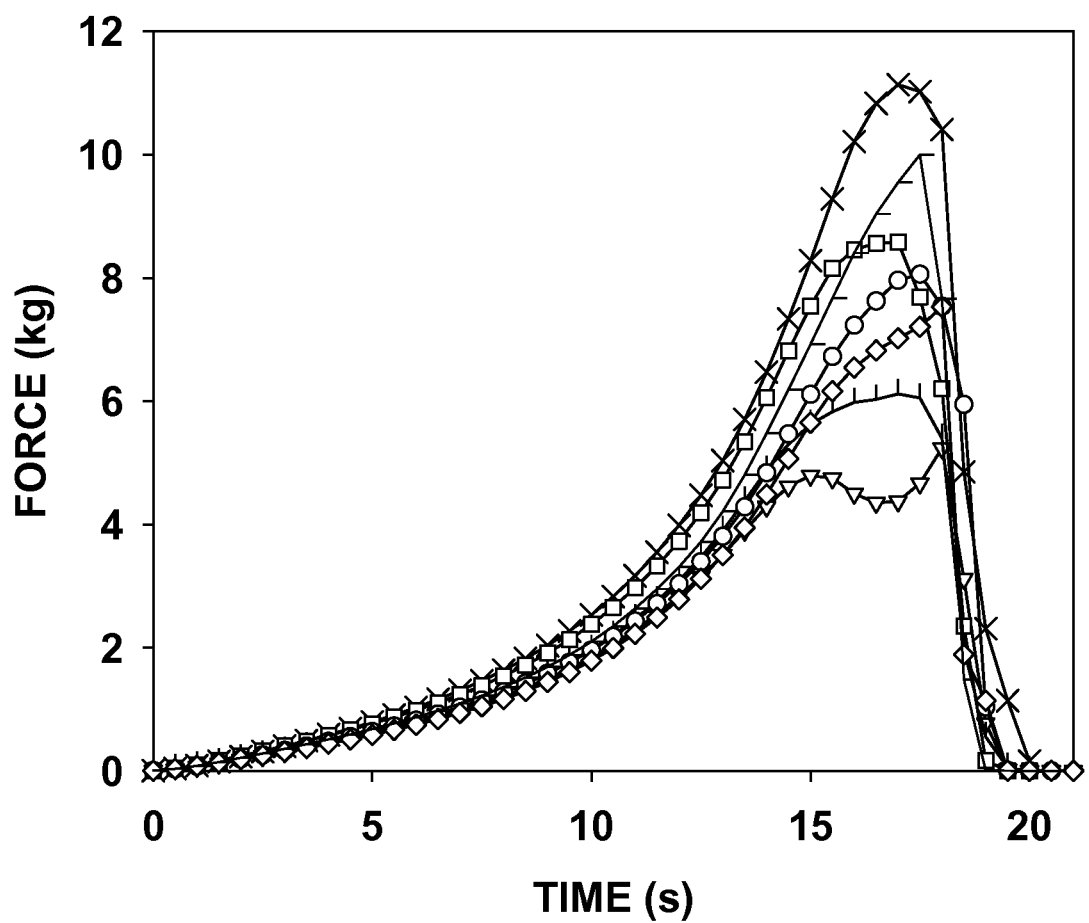
FIG. 5 is a graph illustrating force as a function of time for the non-fat cheese base (x), and the NFPC containing 0% (∇), 0.1% (|), 0.5% (□), 1% (○), 2% (◇), and 4% (—) glyceride.

The results generated for the uniaxial compression of the pH 5.6 cheese base and the NFPC can be seen in FIG. 5. The force measured indicates the amount of kilograms (kg) used to compress the cheese samples. Samples were compressed once to 20% of their original height. Data points are means of 5 replicates. As shown in FIG. 5, all NFPC required less force during compression than the pH 5.6 cheese base indicating that the NFPC were softer. The NFPC with no added glyceride was the softest and also showed the presence of an inflection point in its compression curve. In studies carried out on Cheddar cheese samples, the appearance of an inflection point indicates that the cheese structure is beginning to fail. The NFPC with added glycerides were found to be harder than the NFPC with no added glyceride, which is in agreement with results found during TPA. There was also no evidence of an inflection point in any of the NFPC containing glycerides, again indicating a difference in the nature of the bonds in these cheeses resulting in a more rubbery texture in the cheese.

Microstructural Analysis

Transmission electron micrographs for the NFPC containing various levels of glycerides can be seen in FIG. 6. The scale bars for FIG. 6(*a*), 6(*b*), 6(*c*), and 6(*d*) are 5 µm. Micrograph 6(*e*) shows the light areas in the NFPC containing 4% glyceride. The scale bar for FIG. 6(*e*) is 500 nm. The micrograph in FIG. 6(*f*) shows serum pockets present in the NFPC containing 1% glyceride. The scale bar for FIG. 6(*f*) is 2 µm.

Micrograph 6(g) shows a glyceride dense region in the protein matrix. The scale bar for the micrograph in FIG. 6(g) is 2 μm.

Due to the very low fat levels in the cheeses, the system is primarily made up of a dense protein matrix (gray background) containing serum pockets scattered throughout due to the high moisture content (about 59%) of the cheeses. Serum pockets have previously been identified in non-fat cheese systems (Mizuno and Lucey, 2005, *J. Dairy Sci.* 88: 3070-3078). As the glyceride content in the NFPC was increased from 0.1-4%, as shown in FIG. 6(a)-(d), so too did the appearance of thin white lines in the protein matrix. These breaks in the continuity of the protein matrix might in fact be imprints left by the glycerides. The glycerides are water-soluble and were most likely washed from the protein matrix during sample preparation leaving gaps in the protein matrix such as those seen in FIG. 6(d). The appearance of needle-like imprints in micrographs of processed cheese samples has been previously observed (Caric et al., 1985, *Food Microst.* 4: 297-312).

The glycerides appear to have interacted in several ways in the cheese. Most commonly, the glycerides are found evenly distributed throughout the protein matrix as the glycerides bind to the hydrophilic or hydrophobic regions on the caseins. In some cases, the glycerides were also found to interact with one another resulting in areas of the cheese containing large quantities of glyceride, as shown in FIG. 6(g). Another interesting observation can be seen in FIG. 6(f). The light grey areas represent some of the fat present in the system. This figure illustrates multiple emulsions (Friberg and Larsson, 1997, *Food Emulsions,* 3rd Edition, Marcel Dekker Inc., New York, N.Y.), which was brought about by the surface active properties of the glycerides. In other words, the glycerides are soluble in both oil and water (St. Angelo and Vercellotti, 1989, In: *Food Emulsifiers: Chemical, Technological, and Functional Properties and Applications*, Vol. 19., Charalambous and Doxastakis eds., Elsevier, London) and can form stable water and oil emulsion such as the one seen here.

FIG. 6(e) shows the presence of light areas in the protein matrix, which increased as the concentration of glyceride was increased in the NFPC. The occurrence of these light areas would suggest that the protein in the cheese system has undergone changes becoming less dense and therefore that a reduction in the protein-protein interactions has taken place. This is most likely due to the greater propensity of the glyceride, due to its low molecular weight, to bind with other proteins in the system, in turn bringing about a reduction in the protein-protein interactions present and an increase in the protein-glyceride interactions.

Sensory Trials

Formal sensory trials using trained panelists were carried out on the NFPC following baking and the results of these trials are found in Table 6. The NFPC samples were creamy white in color and this color was maintained during both heating and cooling of the product. In the past it was found that a paler color could be achieved in some non-fat cheeses upon heating, however, their characteristic undesirable translucent color returned upon cooling (Metzger et al., 2000, *J. Dairy Sci.* 83: 1-10). In contrast, the cheeses of the present invention result in desirable creamy white color that is maintained upon cooling. In Table 6, the following scale intensity was used in the evaluation of the attributes: 0-1.5=none; 1.5-3.75=very slight; 3.75-6.25=slight; 6.25-8.75=slight to definite (moderate); 8.75-11.25=definite (moderate); 11.25-13.75=definite (moderate) to pronounced (strong).

TABLE 6

Sensory attributes for the NFPC containing increasing levels of glycerides determined by trained panelists

| Treatment Glyceride Levels | Sensory Attributes | | | | |
|---|---|---|---|---|---|
| | Cohesiveness of mass | Chewiness | Hardness | Skinning | Force to Stretch |
| 0% | 11.9$^a$ | 10.2$^a$ | 5.5$^c$ | 10.2$^a$ | 5.5$^a$ |
| 0.1% | 11.0$^a$ | 9.3$^{bc}$ | 6.6$^b$ | 9.5$^a$ | 4.5$^a$ |
| 0.5% | 11.0$^a$ | 9.5$^b$ | 7.0$^a$ | 9.7$^a$ | 5.4$^a$ |
| 1.0% | 11.2$^a$ | 9.5$^{ab}$ | 6.2$^b$ | 10.6$^a$ | 5.7$^a$ |
| 2.0% | 11.1$^a$ | 9.9$^{ab}$ | 6.2$^b$ | 10.8$^a$ | 4.7$^a$ |
| 4.0% | 11.2$^a$ | 8.7$^c$ | 4.9$^d$ | 6.2$^b$ | 3.7$^a$ |

$^{a\text{-}d}$Means with different superscript letters within the same column are significantly different ($P < 0.05$)

The NFPC were not sticky when both heated and cooled. High moisture, directly acidified non-fat cheeses have in the past been very "soupy" during heating, indicating excessive melting of the cheeses. This "soupiness" also meant that good stretch could not be obtained. However, the NFPC being investigated here had extremely good stretchability, an attribute which has in the past been associated with mozzarella or pizza-type cheeses. The addition of >1% glyceride to the NFPC resulted in a decrease in the force to stretch and hardness of the heated NFPC indicating a softer structure in these cheeses.

The formation of an undesirable "plastic skin" on the surface of non/low-fat cheeses is a common problem in their use in baked products (Mistry, 2001, *Int. Dairy J.* 11: 413-422; see also FIG. 7A). A significant reduction in skinning was achieved in the present invention for the NFPC containing 4% glyceride, which greatly increases its applicability to baked foods. The concentration of the glyceride added to the NFPC during cooking had a direct impact on the hardness and the chewiness of the cheeses when baked. These sensory attributes can be easily regulated or tailored to suit various customer preferences for the desired degree of chewiness or hardness/softness in the cheese.

The addition of glycerides appeared to impact the NFPC in different ways depending on whether the cheese was heated or not. Compression tests were carried out on the NFPC at 4° C. and results showed that the NFPC with added glycerides were harder than those with no glyceride addition. This increase in hardness was attributed to the fact that the NFPC structures were highly connected with many interactions present in the system such as casein-casein, casein-glyceride, and glyceride-glyceride. Such interactions were clearly seen in the transmission electron micrographs taken for the NFPC. The pH 5.6 cheese base and the NFPC recorded very low adhesiveness values and were therefore not sticky. Viscosity, meltability and rheological experiments required heating of the NFPC during analysis. Rheological tests involved small deformation of the samples and it was found that addition of high levels of glyceride, in the amount of >1%, resulted in a reduction in maximum TD (tangent delta). This was due to an increase in the number and strength of hydrophobic interactions in the cheese or was also possibly due to the presence of protein dense regions in the cheese matrix. Large deformation tests, however, followed the opposite trend with melt increasing and viscosity decreasing in the NFPC with >1% glyceride addition. Not wanting to be bound by the following theory, this effect was most likely due to proteins and glycerides competing for hydrophobic/hydrophilic binding sites on other proteins in the cheese matrix resulting in a type of casein dispersion in the system and the formation of a softer more meltable structure. This theory was supported by the appearance of light areas in transmission electron micrographs of the cheeses. The light areas were found to increase as the concentration of glyceride increased in the NFPC and were most likely due to a reduction in protein density as a result of fewer protein-protein interactions and an increase in protein-glyceride interactions in the system.

Sensory analysis revealed that glyceride addition could be used to tailor-make a low-fat or fat-free processed cheese with certain desired attributes, such as increased or decreased chewiness/hardness. Non-fat processed cheeses with added glycerides were a creamy white color when both heated and cooled and higher levels of glyceride addition were also shown to greatly reduce skinning in the heated NFPC. From these results, it is clear that the addition of glycerides to the NFPC largely increased the applicability of these cheeses for use in baked food products. Analysis of the slice properties indicated that at glyceride levels of between 2% and 4% slices with low stickiness, good firmness and not very obvious brittleness were obtained.

Example of Manufacture of Low-Fat Mozzarella

To about 272 kg (600 lb) of cold skim milk (4° C.), citric acid was added in several aliquots until the target pH 5.6 of the milk had been reached and maintained for approximately 30 min. Then calcium chloride at a ratio of 0.01% of the weight of the milk was added to improve the strength of the rennet coagulum. The milk was then heated to about 33.3° C. at which point rennet was added to clot the milk. When the coagulum was sufficiently firm, it was cut using ½-inch (12.7 mm) knives. The curd-whey mixture was then stirred as the temperature in the vat was increased from about 33.3° C. to about 36.7° C. over a 20 min period. Once the cooking temperature (36.7° C. in this example) was reached, the whey was completely drained from the vat over a 10 min period. The curd was then dry salted at a rate of about 1 kg (2.25 lb) salt (NaCl) per about 454 kg (1000 lb) milk. Then curd was filled into 9.1 kg (20 lb) Wilson style stainless steel hoops and pressed for 60 min at 0.276 MPa (40 psi). Two 9.1 kg (20 lb) blocks of cheese were obtained from each vat.

The cheese curd was shredded using a mechanical cheese shredder and added to a twin screw cooker equipped with direct and indirect steam injection. Shredding was performed either immediately following removal from the press or after storage for up to a few weeks.

To 9.1 kg (20 lb) of shredded curd cheese, water (to adjust the final moisture content of the process cheese to ~59%), and 4% of mono/diglycerides were added to the cooker and mixed. The mixture was then mixed and heated to 70° C. using a combination of direct steam and indirect steam. Once this temperature was reached the heat was turned off and the cheese was held at 70° C. for 4 min.

Vacuum pressure (1.38 kPa, i.e., 0.2 psi) was applied following the holding time for a total of 15 s to help remove air bubbles, and the mixer was switched off after 10 s of vacuum. The molten cheese was then poured into 9.1 kg (20 lb) Wilson style hoops, and stored at 4° C.

The composition of the obtained low-fat Mozzarella cheese was: 59.2% relative moisture; pH of 5.60; 30.1% relative amount of protein; 4.7% relative amount of fat; 385 mg total calcium/100 g cheese.

Example of Manufacture of Fat-Free Processed Cheese with Improved Baking Properties In one example of the present invention, stirred curd cheese bases were manufactured by direct acidification of skim milk using citric acid to bring the pH to 5.6. Various levels (0%, 0.1%, 0.5%, 1%, 2%, and 4%) of a mono-/diglyceride blend (60:40) were added to the grated non-fat cheese base during non-fat processed cheese (NFPC) manufacture in a Blentech twin-screw cooker along with water to maintain final moisture content of about 59%. Molten cheese was poured into 9 kg Wilson-style hoops and stored at 4° C. for 7 days before being analyzed.

Glyceride addition impacted the NFPC in different ways depending primarily on whether the cheese was heated or not. Compression tests carried out at 4° C. found that there was increased hardness in the NFPC with added glycerides compared to the NFPC with no glyceride addition. For tests that involved heating the NFPC samples, melt increased and viscosity decreased for samples containing>1% glyceride. The results from the rheological analysis of the NFPC followed the opposite trend with glyceride levels>1% in the NFPC resulting in a reduction in the maximum tangent delta (TD) and therefore a reduction in NFPC meltability.

Microstructural analysis of the NFPC using transmission electron microscopy (TEM) revealed that the added glycerides interacted in different ways in the protein matrix and also showed the appearance of light areas in the cheese images. The incorporation of glycerides had very positive effects on the NFPC during baking. The NFPC were white in color when both heated and cooled, they were not sticky, and minimal skinning occurred on the melted cheese surface. The concentration of glyceride in the NFPC had a direct impact on the chewiness and hardness of the cheeses when baked. These sensory attributes could be easily regulated to suit customer preferences for the desired degree of chewiness or hardness/softness in the baked NFPC.

Figure 7:
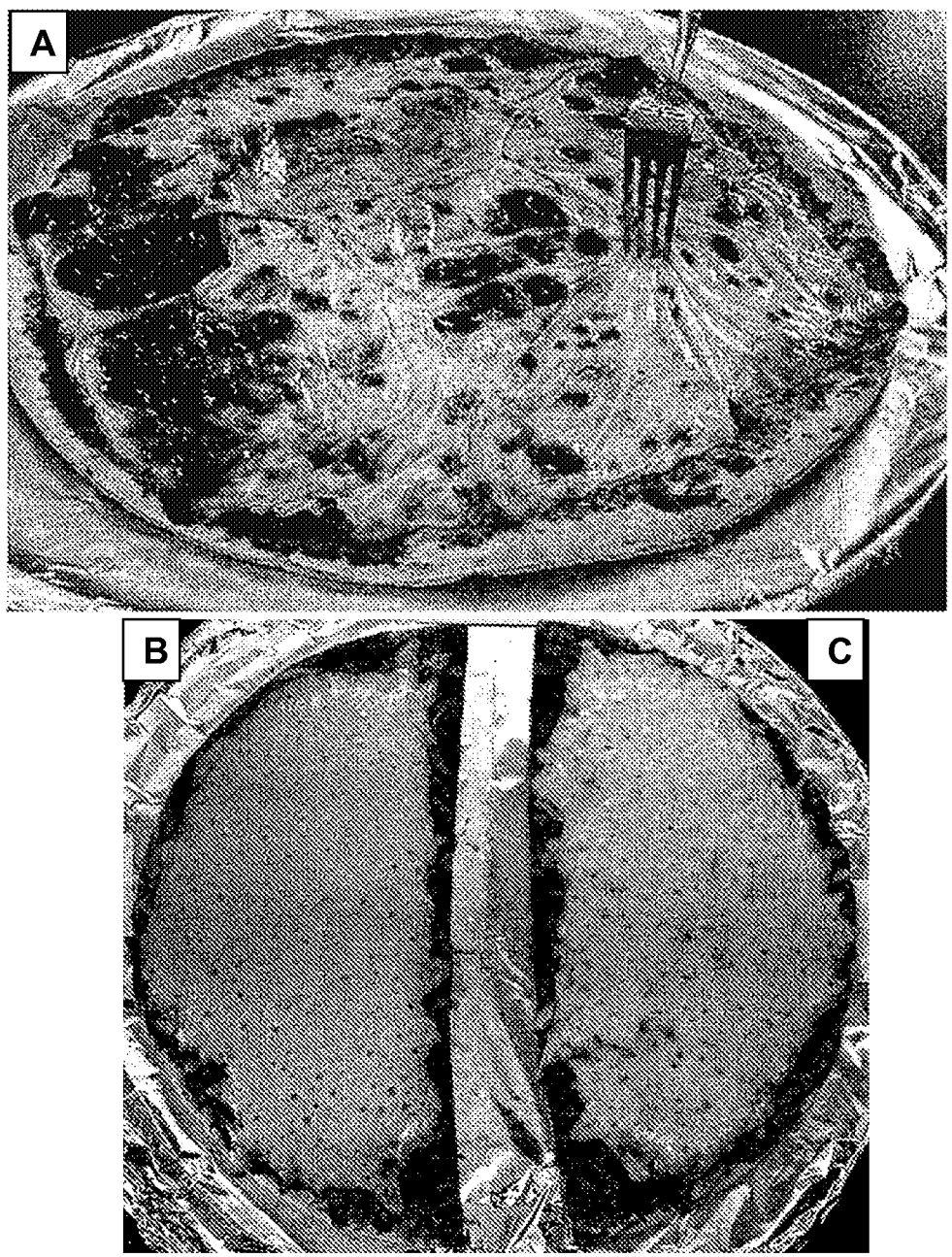
FIG. 7 shows comparative images of: (A) commercial fat-free processed Mozzarella cheese; (B) cheese of the present invention made with the addition of 0.5% glyceride blend (w/w); (C) cheese of the present invention made with the addition of 2% glyceride blend (w/w).

FIG. 7 shows comparative images of: (i) commercial fat-free processed Mozzarella cheese (FIG. 7A); (ii) fat-free processed cheese of the present invention made with 0.5% glyceride (FIG. 7B); (iii) fat-free processed cheese of the present invention made with 2% glyceride (FIG. 7C). The commercially available fat-free processed Mozzarella was baked in a conventional oven at approximately 232° C. for 12 minutes. Note the development of "plastic skin" and blackening on the surface. The two cheeses shown in FIG. 7(B) and FIG. 7(C) were made according to the present invention. Like the commercial fat-free processed Mozzarella above (FIG. 7A), each of these two cheeses was baked in a conventional oven at approximately 232° C. for 12 minutes. In contrast to the baked Mozzarella shown in FIG. 7(A), the cheese color for both types of fat-free cheese produced according to this invention was white, little skin was obvious, the shreds had nicely fused, and there was limited browning or blackening (FIGS. 7B and 7C).

Effect of Different Types of Emulsifiers on the Functional Properties of Low-Fat Process Cheese The impact of different types of emulsifiers (EM) on the textural and rheological properties of low-fat process cheese (LPC) was investigated. After a preliminary screening of 9 different types of EM, small lab-scale LPC were prepared from fat-free cheese base (that was made by direct acidification of skim milk to pH 5.6 using citric acid), and the addition of 6 different EM at 4% level (Tables 7 and 8); citric acid esters (CAE), diacetyl tartaric acid esters of monoglycerides (DATEM) (anionic), N-cetyl-N,N,N trimethylammonium bromide (CTAB) (cationic), LAE—Lactic Acid Esters, distilled monoglycerides (DM), and mono-diglycerides (MD) (non-ionic). No citrate or phosphate-based salts were used for LPC manufacture. Control nonfat process cheese was made without any EM. Moisture content and pH of LPC were kept constant at 63.0% and 5.5, respectively. Texture profile analysis was used to determine adhesiveness and hardness at 40 and 80% compression levels (CL). Meltability was measured by UW Melt-Profiler for the degree of flow (DOF). Small amplitude oscillatory rheometry determined storage modulus (G' or stiffness) and loss tangent (LT; a meltability indicator) during heating from 5 to 85° C.

LPC with EM were softer than control at 40% CL but harder than control (except for DATEM and CTAB) at 80% CL. LPC made with DATEM and CTAB had similar properties except that DATEM exhibited fracture during compression while CTAB cheese was sticky. LPC with DM, MD, and CAE were generally similar and had higher DOF than control. The only major difference between these cheeses was that MD had similar G' values at 8° C. to control whereas DM and CAE had higher G' values. The addition of all types of EM produced cheeses with lower maximum LT and higher G' values at 85° C. relative to control cheese. These results demonstrated that different types of EM can be used to modify both low temperature properties (hardness, fracture) and high temperature properties (melt, flow) of LPC, which would be useful for various applications like slices, blocks and shreds.

TABLE 7

Summary data of the functional properties of Low-Fat Process Cheese (LPC) made with different types of emulsifiers, control LPC and the natural cheese base used to manufacture these

|  | Hardness 40% (N) | Hardness 80% (N) | Peelability (1/N) | Burst Test (N) | DOF$^c$ (%) | Adhesiveness (N) | MLT$^d$ | G'$^e$ at 8° C. (Pa) (10^4) | G' at 85° C. (Pa) | Moisture Content (%) |
|---|---|---|---|---|---|---|---|---|---|---|
| Control | 9.6 | 55 | NA | 2.5 | 73.4 | −0.27 | 4.8 | 2.18 | 7.71 | 65 |
| CAE$^a$ | 8.3 | 77 | 1.53 | 1.6 | 76.0 | −2.13 | 3.7 | 3.38 | 10.5 | 63 |
| DATEM$^a$ | 8.0 | 48 | 2.02 | 1.9 | 66.9 | −0.29 | 3.2 | 2.33 | 17.3 | 63 |
| DM$^b$ | 9.4 | 95 | 1.01 | 2.1 | 74.5 | −2.35 | 4.3 | 3.38 | 10.5 | 63 |
| GTSM$^b$ | 7.4 | 88 | 1.55 | 1.6 | 76.1 | −1.64 | 4.6 | 2.42 | 9.14 | 63 |
| LAE$^b$ | 7.0 | 88 | 1.77 | 2.0 | 75.7 | −1.25 | 4.6 | 1.98 | 8.27 | 63 |
| MD$^b$ | 9.6 | 92 | 2.23 | 2.3 | 73.6 | −1.01 | 4.5 | 3.33 | 13.5 | 63 |
| Base | 18.4 | 119 | NA | NA | 73.0 | −0.14 | 6.5 | 5.46 | 5.21 | 59 |

For the peelability test for Control LPC, LPC sticks together and were not able to be peeled off from the next layer.

TABLE 8

Comparison results relative to the control (Low-Fat Process Cheese made without any addition of emulsifiers) when measuring texture for hardness at 40 and 80% compression level and adhesiveness, peelability and burst test; meltability measured in terms of the degree of flow (DOF); and rheological properties for maximum loss tangent (MLT) and storage modulus (G')

|  | Hardness 40% (N) | Hardness 80% (N) | Peelability (1/N) | Burst Test (N) | DOF (%) | Adhesiveness (N) | MLT | G' at 8° C. (Pa) (10^4) | G' at 85° C. (Pa) |
|---|---|---|---|---|---|---|---|---|---|
| Anionic$^a$ | | | | | | | | | |
| CAE | Softer | Harder |  | Lower (34%) | Higher (4%) | No Sign. Diff | Lower (24%) | Higher (55%) | Higher (36%) |
| DATEM | Softer | Softer |  | Lower (23%) | Lower (9%) | No Sign. Diff | Lower (33%) | Higher (7%) | Higher (124%) |
| Non-Ionic$^b$ | | | | | | | | | |
| DM | Similar | Harder | (Hardest) | Lower (15%) | Higher (1.5%) | No Sign. Diff | Lower (10%) | Higher (55%) | Higher (36%) |
| GTSM | Softer | Harder |  | Lower (40%) | Higher (4%) | No Sign. Diff | Lower (4%) | Higher (11%) | Higher (19%) |
| LAE | Softer | Harder |  | Lower (18%) | Higher (3%) | No Sign. Diff | Lower (4%) | Lower (9%) | Higher (7.3%) |
| MD | Similar | Harder | (Easiest) | Lower (8%) | Higher (0.25%) | No Sign. Diff | Lower (6%) | Higher (53%) | Higher (75%) |
| Cationic$^c$ | | | | | | | | | |
| CTAB | Softer | Softer | NA | NA | No sign. Diff. | Sticky | Lower (78%) | Lower (68%) | Higher (1031%) |
| Base | Higher | Harder | NA | NA | Lower | No Sign. Diff | Higher | Higher | Lower |

Figure 8:
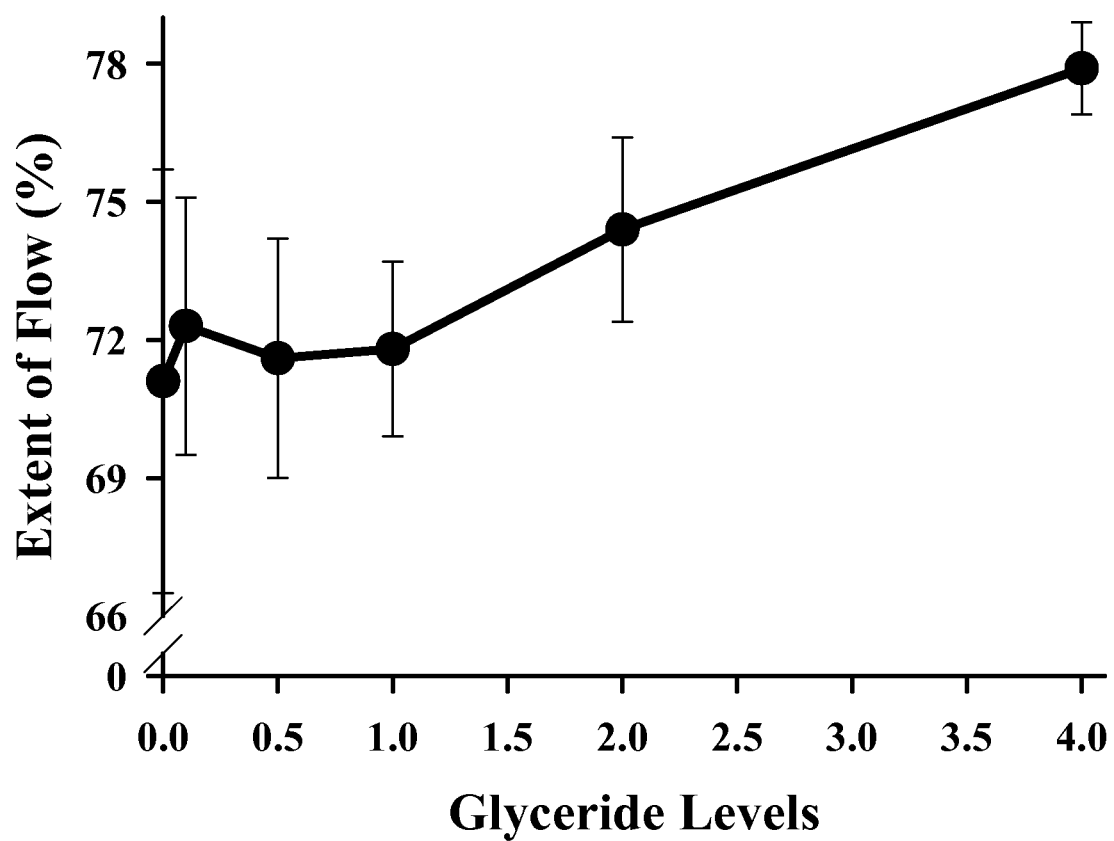
FIG. 8 is a graph illustrating the impact of various concentrations of glycerides on flow of process cheese.

Note:
For peelability test, since the control samples were not able to be analyzed, the values in the table under peelability are their own corresponding values.
$^a$Anionic Emulsifiers: CAE—Citric Acid Esters; DATEM—Diacetyl Tartaric Acid Esters of Monoglycerides
$^b$Non-ionic Emulsifiers: DM—Distilled Monoglycerides; GTSM—GermanTown Star Mulse (Mono-diglyceride); LAE—Lactic Acid Esters; MD—Mono-diglyceride (HP 60, 60% Mono and 40% Di)
$^c$Cationic Emulsifiers: CTAB—N-cetyl-N,N,N trimethylammonium bromide Impact of Various Concentrations of Glycerides on Flow of Process Cheese FIG. 8 is a graph illustrating the changes in extent of flow (measured with the UW-Meltprofiler) of process cheese with different amount of glycerides added. The % extent of flow was calculated as 100×(initial cheese height−cheese height at 60° C.)/initial cheese height. As shown in FIG. 8, the relative extent of flow increased with the amount of glycerides that was added to the cheese base.

It is to be understood that this invention is not limited to the particular devices, methodology, protocols, subjects, or reagents described, and as such may vary. It is also to be understood that the terminology used herein is for the purpose of describing particular embodiments only, and is not intended to limit the scope of the present invention, which is limited only by the claims. Other suitable modifications and adaptations of a variety of conditions and parameters, obvious to those skilled in the art of biochemistry and cheese manufacturing, are within the scope of this invention. All publications, patents, and patent applications cited herein are incorporated by reference in their entirety for all purposes.

What is claimed is:

1. A method for making processed cheese, comprising: a) acidifying a reduced-fat milk source to obtain a cheese base comprising particles; and b) adding between about 0.4 wt. % to about 8 wt. % glycerides to the cheese base to obtain processed cheese, wherein the glycerides comprise between about 40% to about 80% of monoglycerides relative to the amount of glycerides and between about 20% to about 60% of diglycerides relative to the amount of glycerides.

2. The method of claim 1 wherein the reduced-fat milk source is acidified to a pH of between about 5.4 and about 5.8.

3. The method of claim 1 further comprising the step of heating the cheese base to between about 60° C. and about 85° C. prior to adding glycerides.

4. The method of claim 1 further comprising the step of heating the cheese base to between about 60° C. and about 85° C. during adding glycerides.

5. The method of claim 1 further comprising the step of heating the cheese base from about 60° C. to about 85° C. after adding glycerides.

6. The method of any one of claims 3 to 5 further comprising the step of reducing the size of the particles of the cheese base prior to heating.

7. The method of any of claims 3 to 5 further comprising the step of adding water to the cheese base during heating.

8. The method of claim 1 further comprising adding about 4 wt. % glycerides to the cheese base.

9. The method of claim 1 wherein the glycerides comprise about 60% monoglycerides and about 40% diglycerides.

10. The method of claim 1 wherein the glycerides are sequentially added to the cheese base.

11. The method of claim 1 wherein the processed cheese is substantially free of emulsifying salts.

12. The method of claim 1 wherein the cheese base is substantially free of whey.

13. The method of claim 1 further comprising the step of pasteurizing the cheese base prior to acidifying the reduced-fat milk source.

14. The method of claim 1 further comprising the step of warming the reduced-fat milk source to between about 33° C. and about 40° C. prior to acidifying.

15. The method of claim 1 wherein during the acidifying, the reduced-fat milk source is warmed to between about 33° C. and about 40° C.

16. The method of claim 1 wherein the reduced-fat milk source is acidified to a pH of about 5.6.

17. The method of claim 1 wherein the acidifying comprises adding citric acid.

18. The method of claim 1 wherein the processed cheese has a relative moisture content of about 54% to about 64%.

19. The method of claim 1 wherein the processed cheese has a sodium content of less than about 0.7% weight per weight of processed cheese.

20. A processed cheese manufactured according to the method of claim 1.

21. In a method of processed cheese manufacture comprising the step of acidifying a reduced-fat milk source to obtain a cheese base comprising particles, the improvement comprising adding between about 0.4 wt. % to about 8 wt. % glycerides to the cheese base to obtain processed cheese, wherein the glycerides comprise between about 40% to about 80% of monoglycerides relative to the amount of glycerides and between about 20% to about 60% of diglycerides relative to the amount of glycerides.

22. The method of claim 21 comprising acidifying the reduced-fat milk source to a pH of between about 5.4 and about 5.8.

23. A cheese product containing less than about 0.7 wt. % sodium and between about 54 wt. % and about 64 wt. % moisture, which is obtained by acidifying a reduced-fat milk source to a pH of between about 5.4 and about 5.8, to obtain a cheese base comprising particles, and adding between about 0.4 wt. % to about 8 wt. % glycerides to the cheese base, wherein the glycerides comprise between about 40% to about 80% of monoglycerides relative to the amount of glycerides and between about 20% to about 60% of diglycerides relative to the amount of glycerides, to obtain the cheese product.

24. The cheese product of claim 23, which is processed cheese.

25. The cheese product of claim 23, which is heated curd cheese.

* * * * *